United States Patent
Yoshimura et al.

(10) Patent No.: US 11,224,035 B2
(45) Date of Patent: Jan. 11, 2022

(54) TERMINAL APPARATUS, BASE STATION APPARATUS, AND COMMUNICATION METHOD

(71) Applicants: Sharp Kabushiki Kaisha, Osaka (JP); FG Innovation Company Limited, New Territories (HK)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 257 days.

(21) Appl. No.: 16/628,278

(22) PCT Filed: Jul. 18, 2018

(86) PCT No.: PCT/JP2018/026927
§ 371 (c)(1),
(2) Date: Jan. 3, 2020

(87) PCT Pub. No.: WO2019/017391
PCT Pub. Date: Jan. 24, 2019

(65) Prior Publication Data
US 2020/0163060 A1    May 21, 2020

(30) Foreign Application Priority Data
Jul. 18, 2017  (JP) .............................. JP2017-138981

(51) Int. Cl.
*H04L 1/00*   (2006.01)
*H04L 5/00*   (2006.01)
(Continued)

(52) U.S. Cl.
CPC ......... *H04W 72/042* (2013.01); *H04L 1/0061* (2013.01); *H04L 5/0048* (2013.01)

(58) Field of Classification Search
None
See application file for complete search history.

(56) References Cited

U.S. PATENT DOCUMENTS

2011/0223924 A1   9/2011  Löhr et al.
2011/0299483 A1  12/2011  Wu
(Continued)

FOREIGN PATENT DOCUMENTS

| EP | 2393332 A2 | 12/2011 |
| JP | 2014-222896 A | 11/2014 |
| WO | 2017/047445 A1 | 3/2017 |

OTHER PUBLICATIONS

Official Communication issued in International Patent Application No. PCT/JP2018/026927, dated Oct. 9, 2018.
(Continued)

*Primary Examiner* — Duc T Duong
(74) *Attorney, Agent, or Firm* — ScienBiziP, P.C.

(57) ABSTRACT

An apparatus includes: a receiver configured to receive a PDCCH including downlink control information; and a transmitter configured to transmit a sPUSCH, based at least on detection of the PDCCH. The sum of the number of symbols to which the sPUSCH is mapped and the number of SC-FDMA symbols to which a DMRS associated with the sPUSCH is mapped is 2 and/or 3. In a case that a CRC added to the downlink control information is scrambled with a C-RNTI, the index of the SC-FDMA symbol to which the DMRS associated with the sPUSCH is mapped is given based at least on the downlink control information. In a case that the CRC added to the downlink control information is scrambled with an SPS C-RNTI, the index of the symbol to
(Continued)

which the DMRS associated with the sPUSCH is mapped is given based at least on higher layer signaling.

4 Claims, 10 Drawing Sheets

(51) Int. Cl.
*H04W 72/04* (2009.01)
*H04W 72/12* (2009.01)
*H04W 74/04* (2009.01)

(56) References Cited

U.S. PATENT DOCUMENTS

| | | | |
|---|---|---|---|
| 2014/0119266 A1* | 5/2014 | Ng | H04L 27/2602 370/312 |
| 2016/0373915 A1* | 12/2016 | Kim | H04W 76/14 |
| 2017/0034799 A1* | 2/2017 | Kim | H04W 56/003 |
| 2017/0181155 A1 | 6/2017 | Chen et al. | |
| 2018/0042016 A1* | 2/2018 | Babaei | H04L 5/0032 |
| 2018/0255569 A1 | 9/2018 | Aiba et al. | |
| 2019/0007175 A1* | 1/2019 | Kwak | H04L 5/0048 |
| 2019/0036746 A1* | 1/2019 | Hwang | H04L 27/3444 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.

3rd Generation Partnership Project; Technical Specification Group Radio Access Network; Evolved Universal Terrestrial Radio Access (E-UTRA); Physical layer procedures (Release 13), 3GPP TS 36.213 V13.1.1, Mar. 2016, pp. 1-361.

"3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 13)", 3GPP TS 36.300 V13.2.0, Dec. 2015, pp. 1-290.

Ericsson et al., "New SI proposal: Study on Latency reduction techniques for LTE", 3GPP TSG RAN Meeting #67, RP-150465, Mar. 9-12, 2015, 7 pages.

Ericsson, "Physical layer aspects for PUSCH for short TTI", 3GPP TSG RAN WG1 Meeting #84 bis, R1-163320, Apr. 11-15, 2016, pp. 1-3.

Samsung, "Flexible UL DMRS position", 3GPP TSG RAN WG1 Meeting #89, R1-1707884, May 6, 2017, pp. 1-3.

* cited by examiner

| Cyclic Shift Field | $n^{(2)}_{DMRS,\lambda}$ | | | | $[w^{(\lambda)}(0) \quad w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 1] | [1 -1] |
| 001 | 6 | 0 | 9 | 3 | [1 -1] | [1 -1] | [1 -1] | [1 1] |
| 010 | 3 | 9 | 6 | 0 | [1 -1] | [1 -1] | [1 -1] | [1 1] |
| 011 | 4 | 10 | 7 | 1 | [1 1] | [1 1] | [1 1] | [1 -1] |
| 100 | 2 | 8 | 5 | 11 | [1 1] | [1 1] | [1 1] | [1 -1] |
| 101 | 8 | 2 | 11 | 5 | [1 -1] | [1 -1] | [1 -1] | [1 1] |
| 110 | 10 | 4 | 1 | 7 | [1 -1] | [1 -1] | [1 -1] | [1 1] |
| 111 | 9 | 3 | 0 | 6 | [1 1] | [1 1] | [1 1] | [1 -1] |

FIG. 7

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2017-138981 filed on Jul. 18, 2017, the contents of which are incorporated herein by reference.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In LTE Release 13, specifications in which a PUSCH and PUCCH transmit uplink control information are specified (NPL 1, NPL 2, NPL 3, and NPL 4). In NPL 5, reduction of a Transmission Time Interval (TTI) and reduction in processing time have been studied. In NPL 6, it is studied that a sPUCCH and sPUSCH transmit channel state information and Hybrid Automatic Repeat reQuest-ACKnowledgement (HARQ-ACK).

CITATION LIST

Non Patent Literature

NPL 1: "3GPP TS 36.211 V13.1.0 (2016-03)", 29 Mar. 2016.
NPL 2: "3GPP TS 36.212 V13.1.0 (2016-03)", 29 Mar. 2016.
NPL 3: "3GPP TS 36.213 V13.1.1 (2016-03)", 31 Mar. 2016.
NPL 4: "3GPP TS 36.300 V13.2.0 (2015-12)", 13 Jan. 2015.
NPL 5: "New SI proposal: Study on Latency reduction techniques for LTE", RP-150465, Ericsson, Huawei, 3GPP TSG RAN Meeting #67, Shanghai, China, 9-12 Mar. 2015.
NPL 6: "Physical layer aspects for PUSCH for short TTI", R1-163320, Ericsson, 3GPP TSG RAN WG1 Meeting #84 bis, Busan, 11-15 Apr. 2016.

SUMMARY OF INVENTION

Technical Problem

One aspect of the present invention provides a terminal apparatus capable of efficiently performing communication, a communication method used for the terminal apparatus, a base station apparatus capable of efficiently performing communication, and a communication method used for the base station apparatus.

Solution to Problem (1) A first aspect of the present invention is a terminal apparatus including: a receiver configured to receive a physical downlink control channel (PDCCH) including a downlink control information (DCI) format; and a transmitter configured to transmit a physical uplink shared channel (PUSCH), based at least on detection of the PDCCH (PUSCH), wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a demodulation reference signal (DMRS) mapping indication field included in the DCI format is set to a prescribed value, and the DMRS mapping indication field indicates an index of an SC-FDMA symbol in which a DMRS associated with the PUSCH is mapped.

(2) A second aspect of the present invention is a base station apparatus including: a transmitter configured to transmit a physical downlink control channel (PDCCH) including a downlink control information (DCI) format; and a receiver configured to receive a physical uplink shared channel (PUSCH) based at least on detection of the PDCCH, wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a demodulation reference signal (DMRS) mapping indication field included in the DCI format is set to a prescribed value, and the DMRS mapping indication field indicates an index of an SC-FDMA symbol in which a DMRS associated with the PUSCH is mapped.

(3) A third aspect of the present invention is a communication method used for a terminal apparatus, the communication method including the steps of: receiving a physical downlink control channel (PDCCH) including a downlink control information (DCI) format; and transmitting a physical uplink shared channel (PUSCH), based at least on detection of the PDCCH, wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a demodulation reference signal (DMRS) mapping indication field included in the DCI format is set to a prescribed value, and the DMRS mapping indication field indicates an index of an SC-FDMA symbol in which a DMRS associated with the PUSCH is mapped.

(4) A fourth aspect of the present invention is a radio communication method used for a base station apparatus, the communication method including the steps of: transmitting a physical downlink control channel (PDCCH) including a downlink control information (DCI) format; and receiving a physical uplink shared channel (PUSCH) based at least on detection of the PDCCH, wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a DMRS mapping indication field included in the DCI format is set to a prescribed value, and the DMRS mapping indication field indicates an index of an SC-FDMA symbol in which a DMRS associated with the PUSCH is mapped.

Advantageous Effects of Invention

According to one aspect of the present invention, the terminal apparatus can efficiently perform communication. The base station apparatus can efficiently perform communication.

BRIEF DESCRIPTION OF DRAWINGS

FIG. 7 is a diagram illustrating the relationship between a value of a field Z2 and a value $n^{(2)}_{DMRS,\lambda}$ and a value of OCC $[w^{(\lambda)}_{(0)}\ w^{(\lambda)}_{(1)}]$ used to determine a value of a cyclic shift applied to the DMRS, according to one aspect of the present embodiment.

DESCRIPTION OF EMBODIMENTS

Embodiments of the present invention will be described below.

Figure 1:
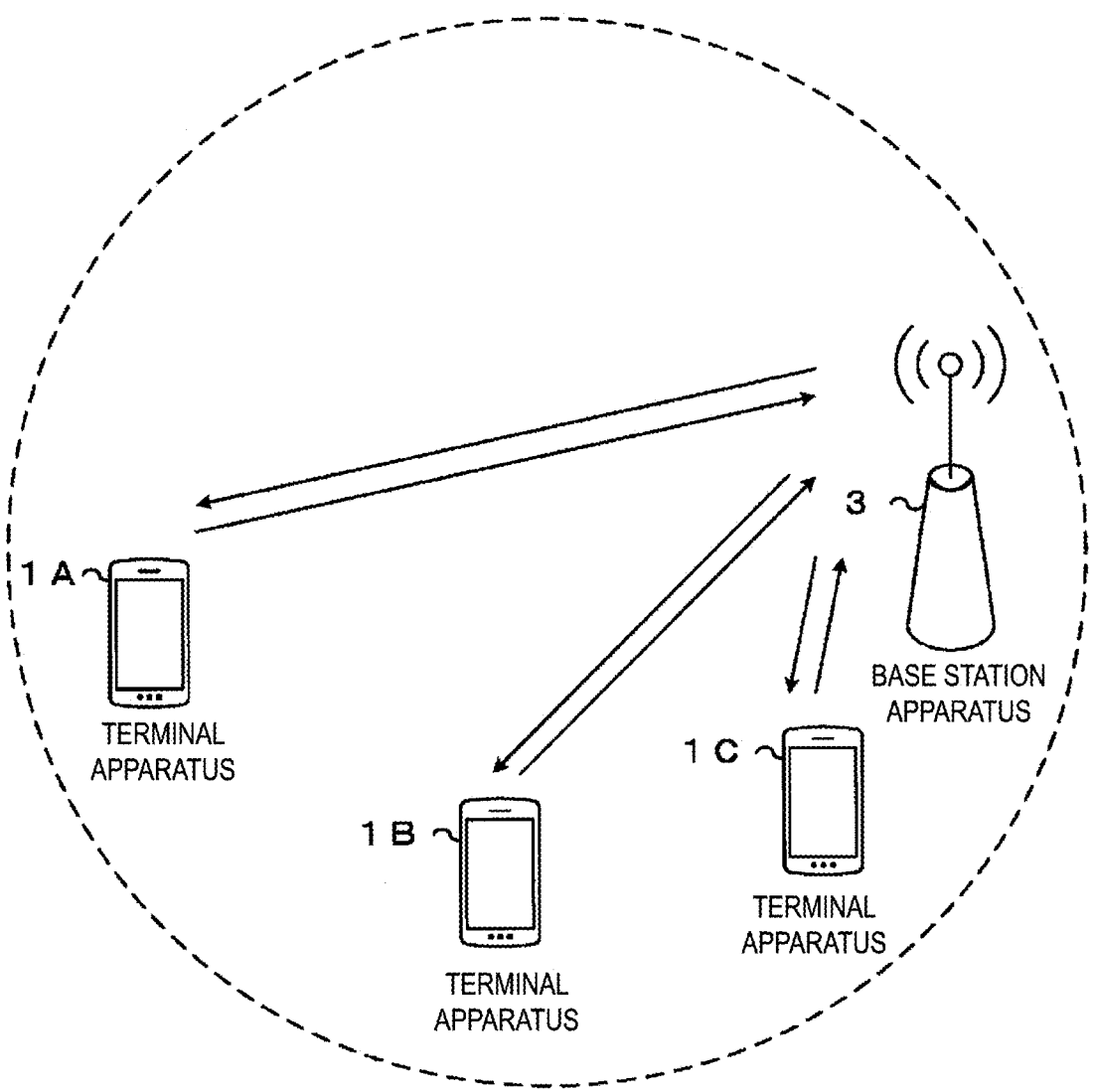
FIG. 1 is a conceptual diagram of a radio communication system according to one aspect of the present embodiment.

FIG. 1 is a conceptual diagram of a radio communication system according to one aspect of the present embodiment. In FIG. 1, the radio communication system includes terminal apparatuses 1A to 1C and a base station apparatus 3. Hereinafter, the terminal apparatuses 1A to 1C are also referred to as a terminal apparatus 1.

A subframe may be constituted with two contiguous slots. A subframe of a subframe index i may be constituted with slots of a slot index 2i and a slot index 2i+1.

Figure 2:
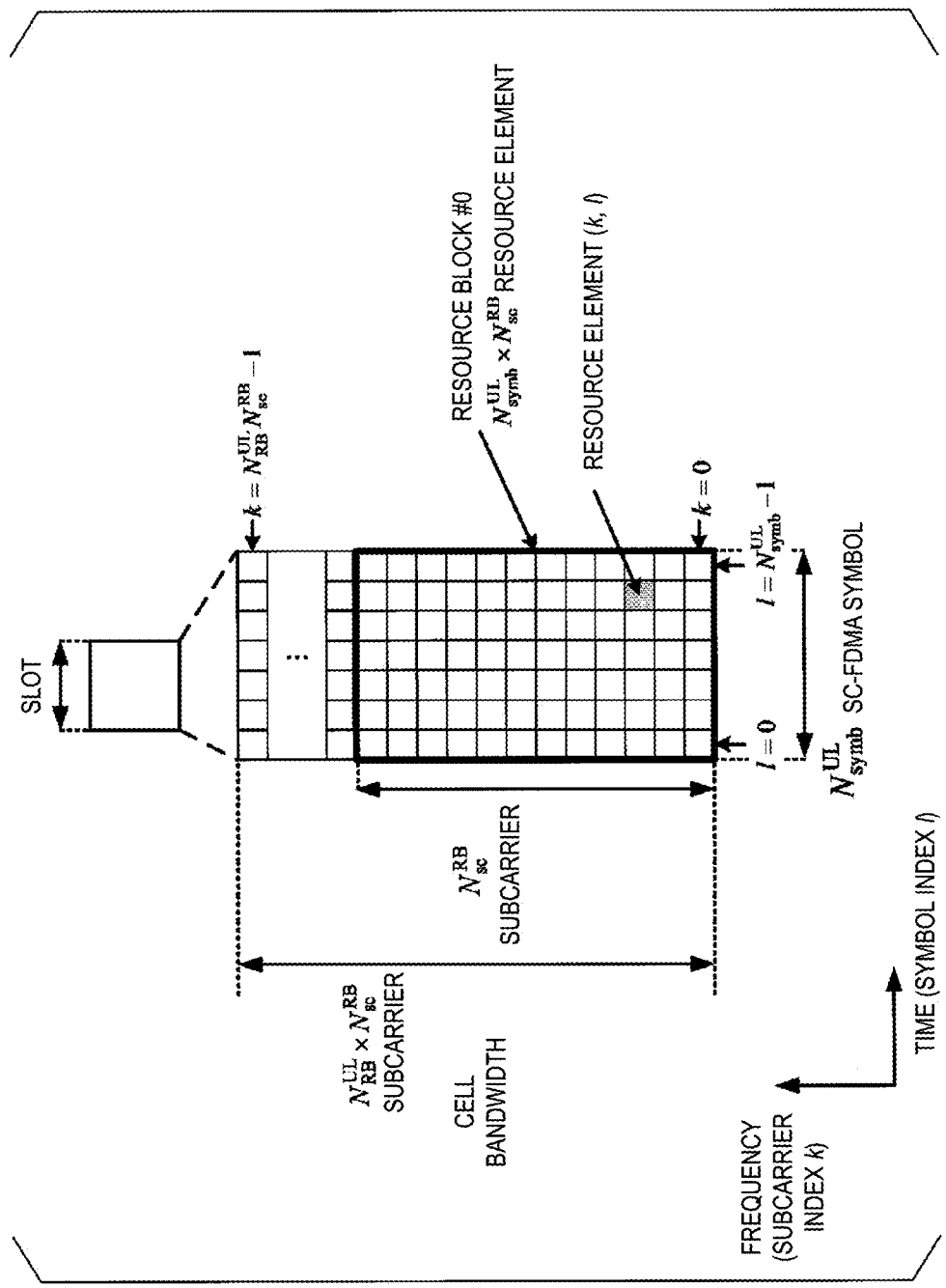
FIG. 2 is a diagram illustrating a schematic configuration example of a resource grid of an uplink slot according to one aspect of the present embodiment.

FIG. 2 is a diagram illustrating a schematic configuration example of a resource grid of an uplink slot according to one aspect of the present embodiment. Signals transmitted in each uplink slot are expressed by one or multiple resource grids given with $N^{UL}_{RB}$ $N^{RB}_{sc}$ subcarriers and $N^{UL}_{symb}$ SC-FDMA symbols. $N^{UL}_{RB}$ indicates a configuration of an uplink band expressed as the number of resource blocks. $N^{RB}_{sc}$ indicates a size of resource blocks of the frequency domain expressed as the number of subcarriers. $N^{UL}_{symb}$ indicates the number of SC-FDMA symbols included in one uplink slot. Hereinafter, a DFT-s-OFDM symbol is referred to as an OFDM symbol. An OFDM symbol is also referred to as a DFT-s-OFDM symbol.

A resource grid of an uplink slot is given for each antenna port. An antenna port is defined as a channel on which a first symbol is transmitted at a given antenna port being estimated by a channel on which a second symbol is transmitted at the given antenna port.

Each of the elements of the resource grid illustrated in FIG. 2 is referred to a resource element. The resource element is expressed by a subcarrier index k and an SC-FDMA symbol index l.

A physical resource block is given by $N^{UL}_{symb}$ SC-FDMA symbols in the time domain and $N^{RB}_{sc}$ consecutive subcarriers in the frequency domain. $N^{UL}_{symb}$ may be 7 in a case that a normal CP is configured. $N^{UL}_{symb}$ may be 6 in a case that an extended CP is configured. $N^{RB}_{sc}$ may be 12.

The terminal apparatus 1 receives the parameter UL-CyclicPrefixLength indicating the CP length in the uplink from the base station apparatus 3. The base station apparatus 3 may broadcast, in the cell, system information including the parameter UL-CyclicPrefixLength corresponding to the cell.

In uplink radio communication from the terminal apparatus 1 to the base station apparatus 3, at least some or all of the following uplink physical channels may be used. The uplink physical channels are used at least for transmitting information output from a higher layer.

Physical Uplink Control Channel (PUCCH)
shortened Physical Uplink Control Channel (sPUCCH)
Physical Uplink Shared Channel (PUSCH)
shortened Physical Uplink Shared Channel (sPUSCH)

Hereinafter, the PUSCH and the sPUSCH are collectively referred to as a PUSCH. The PUCCH and the sPUCCH are collectively referred to as a PUCCH. The PUSCH and the sPUSCH are collectively referred to as an uplink shared channel. The PUCCH and the sPUCCH are collectively referred to as an uplink control channel.

Figure 3:
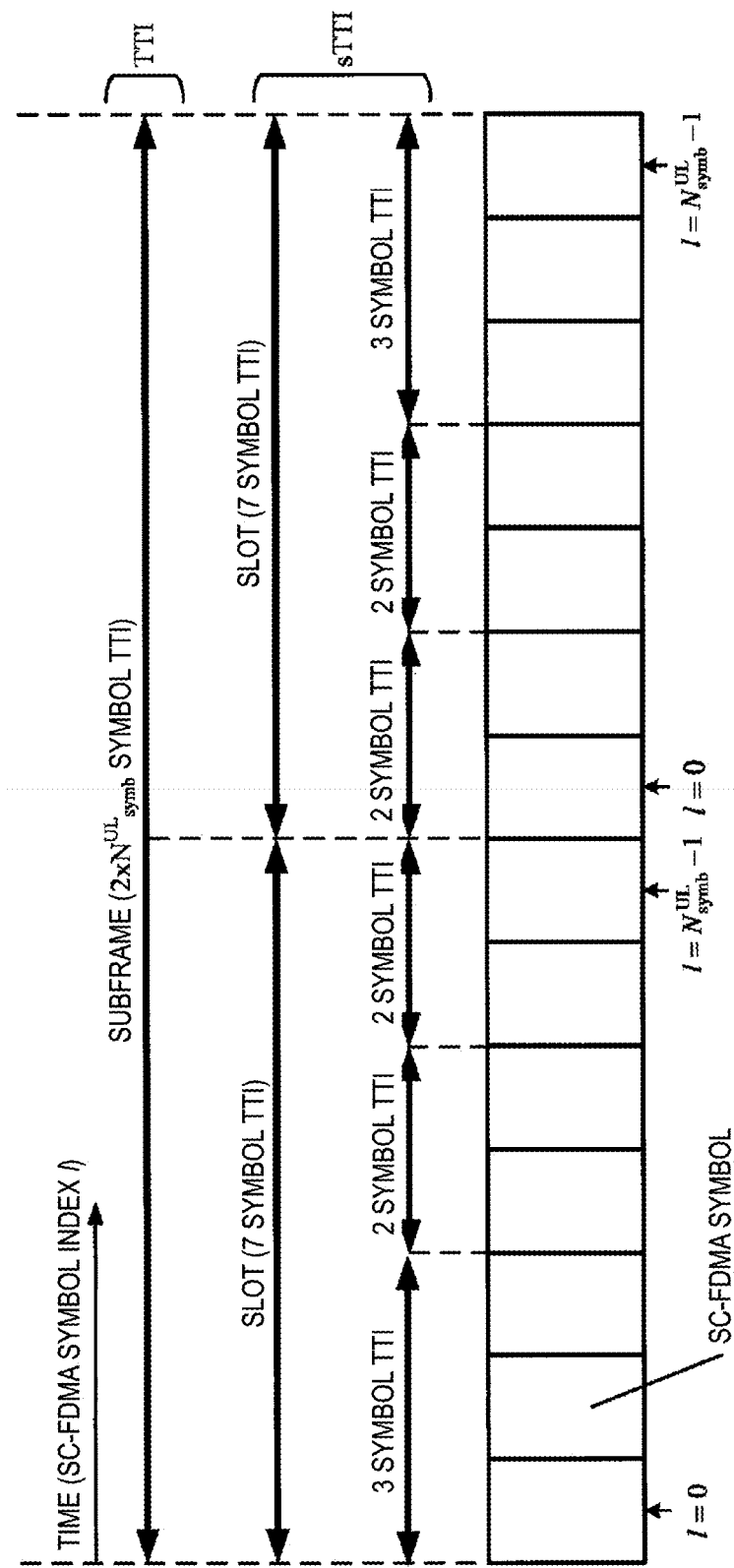
FIG. 3 is a schematic diagram illustrating a Transmission Time Interval (TTI) of an uplink physical channel according to one aspect of the present embodiment.

FIG. 3 is a schematic diagram illustrating a Transmission Time Interval (TTI) of an uplink physical channel according to one aspect of the present embodiment. In FIG. 3, the horizontal axis represents the SC-FDMA symbol index l, and the number of SC-FDMA symbols included in one uplink slot $N^{UL}_{symb}$ is 7. The TTI including one subframe is simply referred to as a TTI or subframe TTI. In a case that a spatial multiplexing scheme is configured for the PUSCH in the uplink, two HARQ processes may be associated in the subframe TTI. In a case that no spatial multiplexing scheme is configured for the PUSCH in the uplink, one HARQ process may be associated in the subframe TTI. The spatial multiplexing scheme may be a transmission scheme in which at least two transport blocks correspond in one TTI.

The TTI including one slot is also referred to as a slot TTI. In a case that a spatial multiplexing scheme is configured for PUSCH_slot in the uplink, two HARQ processes may be associated in the slot TTI. In a case that no spatial multiplexing scheme is configured for PUSCH_slot in the uplink, one HARQ processes may be associated in the slot TTI.

A TTI including three SC-FDMA symbols and/or two SC-FDMA symbols is also referred to as a two symbol TTI or three symbol TTI. In a case that a spatial multiplexing scheme is configured for sPUSCH_short in the uplink, two HARQ processes may be associated in the slot TTI. In a case that no spatial multiplexing scheme is configured for sPUSCH_short in the uplink, one HARQ processes may be associated in the slot TTI.

The slot TTI, the two symbol TTI, and the three symbol TTI are also referred to as short TTI (sTTI).

The PUCCH and/or the sPUCCH may be used to transfer Uplink Control Information (UCI). The PUCCH and/or the sPUCCH may transfer uplink control information.

The uplink control information may include at least some or all of Channel State Information (CSI) of the downlink, a Scheduling Request (SR) indicating a request of a PUSCH resource, a Hybrid Automatic Repeat request ACKnowledgement (HARQ-ACK) to downlink data (Transport block, Medium Access Control Protocol Data Unit (MAC PDU), Downlink-Shared Channel (DL-SCH)). The HARQ-ACK indicates an acknowledgement (ACK) or a Negative-ACKnowledgement (NACK). The HARQ-ACK is also referred to a an ACK/NACK, an HARQ feedback, an HARQ-ACK feedback, an HARQ response, an HARQ-ACK response, HARQ information, HARQ-ACK information, HARQ control information, and HARQ-ACK control information.

A baseband signal of the PUSCH may be at least defined in terms of the following procedure U1 to the procedure U7. (Procedure U1) scrambling (Procedure U2) modulation of a scrambling bit sequence for generating complex-valued modulation symbols (complex-valued symbols) (Procedure U3) mapping of complex-valued modulation symbols to one or multiple transmission layers (Procedure U4) transmission precoding (transform precoding) of complex-valued modulation symbols (Procedure U5) precoding of complex-valued modulation symbols (Procedure U6) mapping of complex-valued modulation symbols to resource elements (Procedure U7) generation of complex-valued SC-FDMA signals in the time domain (complex-valued time-domain SC-FDMA signals)

The procedure U1 may be scrambling the bit sequence 100001, based at least on the scrambling sequence. The procedure U1 may be scrambling the bit sequence 100001, based at least on the scrambling sequence for each codeword. The bit sequence 100001 may be a block including multiple bits (block of bits). The bit sequence 100001 may be a sequence given based at least on the coding of the transport block.

In baseband signal generation of the PUSCH, the bit number of the bit sequence 100001 may be $M_{bit}$. $M_{bit}$ may be the number of bits transmitted in the PUSCH in one subframe.

The sequence of coded bits corresponding to one transport block after coupling of the multiple code blocks may be referred to as a codeword. In other words, one transport block may correspond to one codeword.

The scrambling sequence used for the scrambling of the bit sequence 100001 may be a sequence specific to the terminal apparatus 1. The scrambling sequence used for the scrambling of the bit sequence 100001 may be given based at least on the value of the Radio Network Temporary Identifier (RNTI). The scrambling sequence used for the scrambling of the bit sequence 100001 may be given based at least on the value of RNTI, the codeword index q, and the cell ID. The cell ID may be an index given based at least on the synchronization signal.

The value of RNTI may be given based at least on a sequence that scrambles the Cyclic Redundancy Check (CRC) sequence added to the PDCCH. The CRC sequence is also referred to as CRC parity bits or CRC. In a case that higher layer signaling configures the terminal apparatus 1 for PDCCH decoding with a CRC sequence scrambled with a prescribed RNTI, the terminal apparatus 1 may decode the PDCCH and transmit the PUSCH corresponding to the PDCCH. The value of RNTI used for scrambling of the PUSCH may be given based at least on the prescribed RNTI. The prescribed RNTI may include at least some or all of Cell-RNTI (C-RNTI), Temporary C-RNTI, System Information-RNTI (SI-RNTI), Paging-RNTI (P-RNTI), semi Persistent Scheduling (SPS) C-RNTI.

The SPS C-RNTI may be given based at least on higher layer signaling. The higher layer signaling may include at least an SPS-Config Information Element (IE).

The scrambling bit sequence 100002 may be given based at least on scrambling the bit sequence 100001. Based at least on the procedure U1, the scrambling bit sequence 100002 may be given.

The procedure U2 may be to modulate the scrambling bit sequence 100002. The procedure U2 may be to modulate the scrambling bit sequence 100002 for each codeword. The PUSCH may be modulated based at least on some or all of Quadrature Phase Shift Keying (QPSK), 16 Quadrature Amplitude Modulation (QAM), 64QAM, and 256QAM.

The complex-valued modulation symbol sequence 100003 may be given based at least on the modulation of the scrambling bit sequence 100002. Based at least on the procedure U2, the complex-valued modulation symbol sequence 100003 may be given.

The procedure U3 may be mapping the complex-valued modulation symbol sequence 100003 to one or multiple transmission layers. The procedure U3 may be mapping the complex-valued modulation symbol sequence 100003 to one or multiple transmission layers for each codeword. The number of transmission layers is also referred to as $N_v$.

By mapping the complex-valued modulation symbol sequence 100003 to one or multiple transmission layers, the number of transmission layers of the transmission layer complex-valued modulation symbol sequence 100004 may be generated.

The procedure U4 may include dividing the transmission layer complex-valued modulation symbol sequence 100004 by the number of PUSCH subcarriers $M^{PUSCH}_{sc}$ for each transmission layer. The number of complex-valued modulation symbols included in the transmission layer complex-valued modulation symbol sequence 100004 for each transmission layer is also referred to as $M^{layer}_{symb}$. In the procedure U4, the transmission layer complex-valued modulation symbol sequence 100004 where the transmission layer complex-valued modulation symbol sequence 100004 for each transmission layer is divided by $M^{PUSCH}_{sc}$ may correspond to one SC-FDMA symbol.

The number of PUSCH subcarriers $M^{PUSCH}_{sc}$ may be the band of the uplink transmission given by the number of subcarriers. The number of PUSCH subcarriers $M^{PUSCH}_{sc}$ may be given based at least on the DCI format used for scheduling the PUSCH.

The procedure U4 may include applying transform precoding to the transmission layer complex-valued modulation symbol sequence 100004 corresponding to one SC-FDMA symbol for each transmission layer. By transform precoding applied to the transmission layer complex-valued modulation symbol sequence 100004 corresponding to one SC-FDMA symbol, the transform precoding complex-valued modulation symbol sequence 100005 may be given.

The procedure U5 may be precoding for $N_v$ transmission layers of transform precoding complex-valued modulation symbol sequence 100005 to give the precoding complex-valued modulation symbol sequence 100006.

The procedure U6 may be mapping the precoding complex-valued modulation symbol sequence 100006 to resource elements. The procedure U6 may be mapping the precoding complex-valued modulation symbol sequence 100006 to resource elements corresponding to physical resource blocks allocated for transmission of the PUSCH in subframes. The PUSCH may be mapped in subframes. The PUSCH may be mapped to at least part of at least two consecutive slots.

The resource elements to which the precoding complex-valued modulation symbol sequence 100006 is mapped is given first in ascending order with respect to the subcarrier index k and then in ascending order with respect to the SC-FDMA symbol index l. Here, the resource elements to which the precoding complex-valued modulation symbol sequence 100006 is mapped are resource elements not used for transmission of at least reference signals.

In the resource element mapping of the precoding complex-valued modulation symbol 100006, the resource mapping may be given in ascending order from the SC-FDMA symbol index $l=l_{start}$. In the resource element mapping of the precoding complex-valued modulation symbol 100006, the resource mapping may end at the SC-FDMA symbol index $l=l_{end}$. $l_{start}$ may be information indicating the first SC-FDMA symbol to which the PUSCH, the sPUSCH_slot, and/or the sPUSCH_short is mapped. $l_{end}$ may be information indicating the last SC-FDMA symbol to which the PUSCH, the sPUSCH_slot, and/or the sPUSCH_short is mapped. The first SC-FDMA symbol to which the PUSCH, the sPUSCH_slot, and/or the sPUSCH_short is mapped may be an SC-FDMA symbol to which a DMRS associated with the PUSCH, the sPUSCH_slot, and/or the sPUSCH_short is mapped. The last SC-FDMA symbol to which the PUSCH, the sPUSCH_slot, and/or the sPUSCH_short is mapped may be an SC-FDMA symbol to which a DMRS associated with the PUSCH, the sPUSCH_slot, and/or the sPUSCH_short is mapped.

Figure 4:
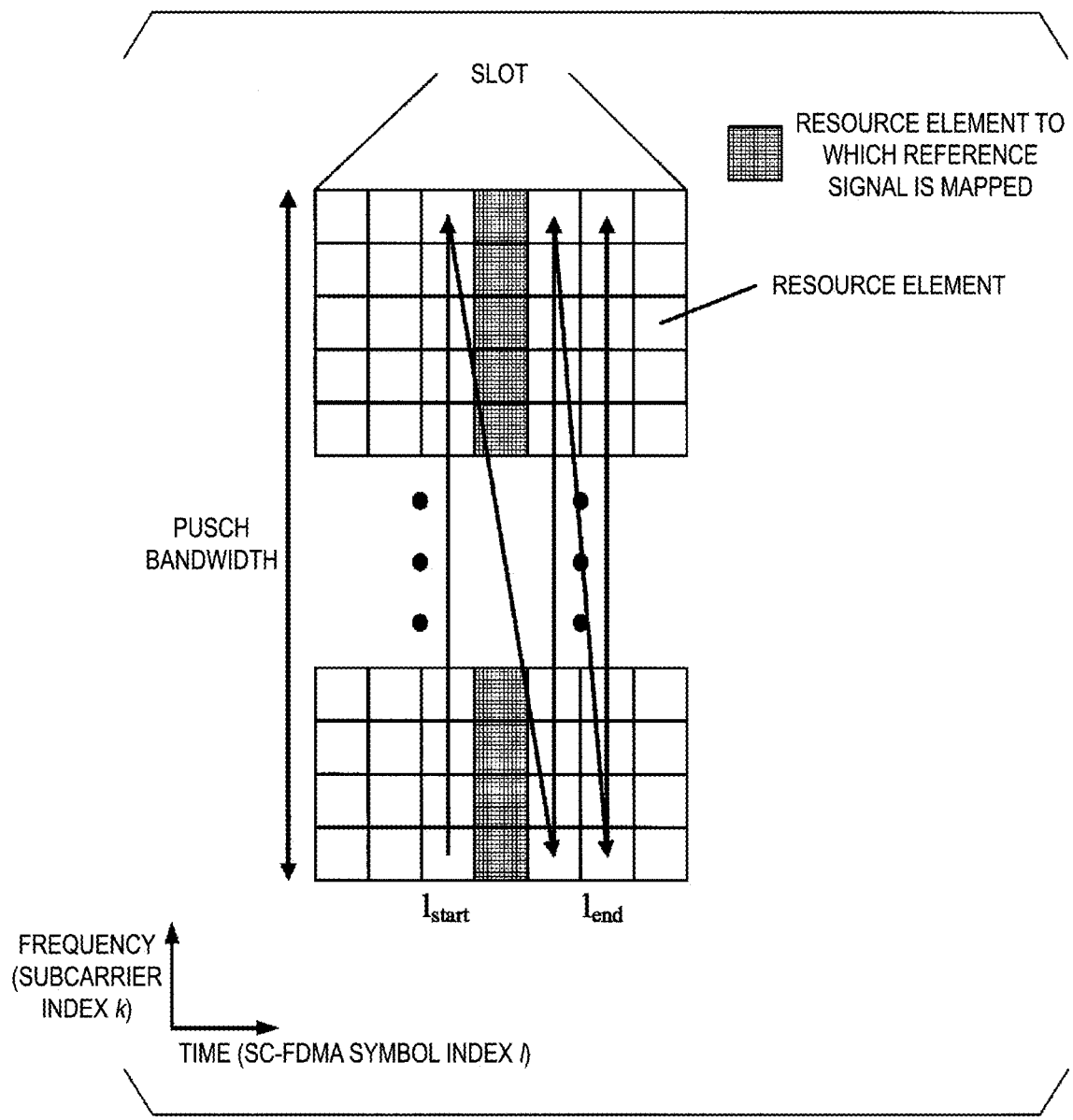
FIG. 4 is a diagram illustrating an example of resource mapping of a precoding complex-valued modulation symbol sequence 100006 according to the present embodiment.

FIG. 4 is a diagram illustrating an example of resource mapping of the precoding complex-valued modulation symbol 100006 according to the present embodiment. The vertical axis in FIG. 4 is a region of the subcarrier index k, and the horizontal axis in FIG. 4 indicates the SC-FDMA symbol index. FIG. 4 illustrates an example in which the precoding complex-valued modulation symbol 100006 is mapped to a bandwidth of the PUSCH allocated in one slot. As illustrated in FIG. 4, the precoding complex-valued modulation symbol 100006 is first mapped in ascending order to the subcarrier index k, and then mapped in ascending order from the SC-FDMA symbol index $l_{start}$ to $l_{end}$. In FIG. 4, resource elements indicated with lattice lines are resource elements to which reference signals are mapped, and the precoding complex-valued modulation symbol 100006 is mapped avoiding the reference signals.

In the baseband signal generation of the PUSCH, $l_{start}$ may include 0. In the baseband signal generation of the PUSCH, $l_{start}$ may correspond to the first SC-FDMA symbol of the slot. In the baseband signal generation of the PUSCH, $l_{end}$ may include 6. In the baseband signal generation of the PUSCH, $l_{end}$ may include $l_{start}+N^{UL}_{symb}-1$. In the baseband signal generation of the PUSCH, $l_{end}$ may correspond to the last SC-FDMA symbol of the slot.

The baseband signal of the sPUSCH may be at least defined in terms of the procedure U1 to the procedure U7. The sPUSCH may be including fewer OFDM symbols than the PUSCH. The Transmission Time Interval (TTI) of the sPUSCH may be shorter than the transmission time interval of the PUSCH. The transmission time interval of the PUSCH may be 1 ms. The sPUSCH may include at least some or all of the sPUSCH_slot and the sPUSCH_short. The sPUSCH_slot may be an sPUSCH mapped to one slot. The sPUSCH_slot may be an sPUSCH mapped to at least seven SC-FDMA symbols and/or six SC-FDMA symbols and/or five SC-FDMA symbols. The transmission time interval of the sPUSCH_slot may be 0.5 ms. The sPUSCH_short may be an sPUSCH mapped to at least three SC-FDMA symbols and/or two SC-FDMA symbols and/or one SC-FDMA symbol. The transmission time interval of the sPUSCH_short may correspond to time of one SC-FDMA symbol and/or two SC-FDMA symbols and/or three SC-FDMA symbols.

In baseband signal generation of the sPUSCH_slot, the bit number of the bit sequence 100001 $M_{bit}$ may be the number of bits transmitted in the sPUSCH_slot in one slot.

In the baseband signal generation of the sPUSCH_slot, $l_{start}$ may include 0. In the baseband signal generation of the sPUSCH_slot, $l_{start}$ may correspond to the first SC-FDMA symbol of the slot. In the baseband signal generation of the sPUSCH_slot, $l_{end}$ may include 6. In the baseband signal generation of the sPUSCH_slot, $l_{end}$ may include $l_{start}+N^{UL}_{symb}-1$. In the baseband signal generation of the sPUSCH_slot, $l_{end}$ may correspond to the last SC-FDMA symbol of the slot.

In baseband signal generation of the sPUSCH_short, the bit number of the bit sequence 100001 $M_{bit}$ may be the number of bits transmitted in the sPUSCH_short in one and/or two and/or three SC-FDMA symbols.

In the baseband signal generation of the sPUSCH_short of the first group of slots, $l_{start}$ may include 0 and/or 3 and/or 5. The first group of slots may be a group including slots corresponding to even numbered slot indexes. The first group of slots may be a group including slots corresponding to the slot index 2i for the subframe index i. In the baseband signal generation of the sPUSCH_short of the first group of slots, $l_{start}$ may include at least a value corresponding to the first SC-FDMA symbol of the slot. In the baseband signal generation of the sPUSCH_short of the first group of slots, $l_{end}$ may include 2 and/or 4 and/or 6. In the baseband signal generation of the sPUSCH_short of the first group of slots, $l_{end}$ may include at least a value corresponding to the last SC-FDMA symbol of the slot.

In the baseband signal generation of the sPUSCH_short of the second group of slots, $l_{start}$ may include 0 and/or 2 and/or 4. The second group of slots may be a group including slots corresponding to odd numbered slot indexes. The second group of slots may be a group including slots corresponding to the slot index 2i+1 for the subframe index i. In the baseband signal generation of the sPUSCH_short of the second group of slots, $l_{start}$ may include at least a value corresponding to the first SC-FDMA symbol of the slot. In the baseband signal generation of the sPUSCH_short of the second group of slots, $l_{end}$ may include 1 and/or 3 and/or 5. In the baseband signal generation of the sPUSCH_short of the second group of slots, $l_{end}$ may include at least a value corresponding to the last SC-FDMA symbol of the slot.

In other words, in the baseband signal generation of the sPUSCH_short, a set of values included in $l_{start}$ and/or $l_{end}$ may be given based at least on whether the sPUSCH_short is mapped to the first group of slots or the second group of slots. In the baseband signal generation of the sPUSCH_short, values included in $l_{start}$ and/or $l_{end}$ may be given based at least on whether the sPUSCH_short is mapped to the first group of slots or the second group of slots.

According to the present embodiment, the following two types of uplink reference signals are used.

Demodulation Reference Signal (DMRS)

Sounding Reference Signal (SRS)

The DMRS is associated with transmission of the PUSCH, the sPUSCH, the PUCCH, or the sPUCCH. The DMRS is time-multiplexed with the PUSCH, the sPUSCH, the PUCCH, or the sPUCCH. The base station apparatus 3 uses the DMRS in order to perform channel compensation of the PUSCH, the sPUSCH, the PUCCH, or the sPUCCH. Transmission of both of the PUSCH and the DMRS is hereinafter referred to simply as transmission of the PUSCH. Transmission of both of the PUCCH and the DMRS is hereinafter referred to simply as transmission of the PUCCH. Transmission of both of the sPUSCH and the DMRS is hereinafter referred to simply as transmission of the sPUSCH. Transmission of both of the sPUCCH and the DMRS is hereinafter referred to simply as transmission of the sPUCCH.

The SRS is not associated with transmission of the PUSCH, the sPUSCH, the PUCCH, or the sPUCCH. The base station apparatus 3 may use the SRS to measure the channel state. The SRS is transmitted in the last SC-FDMA symbol of the subframe in the uplink subframe or an SC-FDMA symbol in UpPTS.

In a case that Interleaved Frequency Division Multiple Access (IFDMA) is configured for the DMRS associated with the PUSCH and the most recent DCI includes a Cyclic Shift Field mapping table for DMRS bit field, the SC-FDMA symbol index l to which the DMRS associated with the PUSCH is mapped is l=3 in the case that the normal CP is configured, and l=2 in the case that the extended CP is configured. In a case that Interleaved Frequency Division Multiple Access (IFDMA) is configured for the DMRS associated with the PUSCH and the Cyclic Shift Field mapping table for DMRS bit field included in the most recent DCI is set to refer to a prescribed table, the DMRS associated with the PUSCH is mapped in ascending order to the extent that subcarrier index k satisfies mod (k, 2)=w, and then mapped in ascending order to the slot number. w is given based at least on the cyclic shift field included in the most recent DCI. mod (a, b) is the remainder of a divided by b. The Cyclic Shift Field mapping table for DMRS bit field may be a cyclic shift field.

The Cyclic Shift Field mapping table for DMRS bit field is used to determine which table is used out of the tables used at least to determine the value of the Cyclic shift. The Cyclic Shift Field mapping table for DMRS bit field is at least used to identify the table referred by the cyclic shift field. In a case that a CRC added to a DCI format including at least the Cyclic Shift Field mapping table for DMRS bit field is scrambled with the SPS C-RNTI, the Cyclic Shift Field mapping table for DMRS bit field is set to 0.

In a case that Interleaved Frequency Division Multiple Access (IFDMA) is not configured for the DMRS associated with the PUSCH or the most recent DCI does not include the Cyclic Shift Field mapping table for DMRS bit field, the SC-FDMA symbol index l to which the DMRS associated with the PUSCH is mapped is l=3 in the case that the normal CP is configured, and l=2 in the case that the extended CP is configured. In a case that Interleaved Frequency Division Multiple Access (IFDMA) is not configured for the DMRS associated with the PUSCH or the most recent DCI does not include the Cyclic Shift Field mapping table for DMRS bit field, the DMRS associated with the PUSCH is mapped in ascending order to the subcarrier index k and then mapped in ascending order to the slot number. The DMRS associated with the sPUSCH may be mapped to one subframe. The DMRS associated with the sPUSCH may be mapped to two slots.

The SC-FDMA symbol index l to which the DMRS associated with the sPUSCH_slot is mapped may be l=3. The DMRS associated with the sPUSCH_slot may be mapped in ascending order to the subcarrier index k. The DMRS associated with the sPUSCH_slot may be mapped to one slot.

The SC-FDMA symbol index l to which the DMRS associated with the sPUSCH_short is mapped may be given based at least on the DCI for scheduling the sPUSCH_short. The DMRS associated with the sPUSCH_short may be mapped in ascending order to the subcarrier index k. The DMRS associated with the sPUSCH_slot may be mapped to one slot.

The SC-FDMA symbol index l to which the DMRS associated with the sPUSCH_short is mapped may be given based at least on DMRS mapping indication information included in the DCI for scheduling the sPUSCH_short. The DMRS mapping indication information may be at least included in the DCI and is information indicating the SC-FDMA symbol index l to which the DMRS associated with the sPUSCH_short is mapped. The DMRS mapping indication information may be implicitly included in another field of the DCI. The DMRS mapping indication information may be included in a field coupled to another field of the DCI.

The SC-FDMA symbol index l to which the DMRS associated with the sPUSCH_short is mapped may be given based at least on the DCI.

Figure 5:
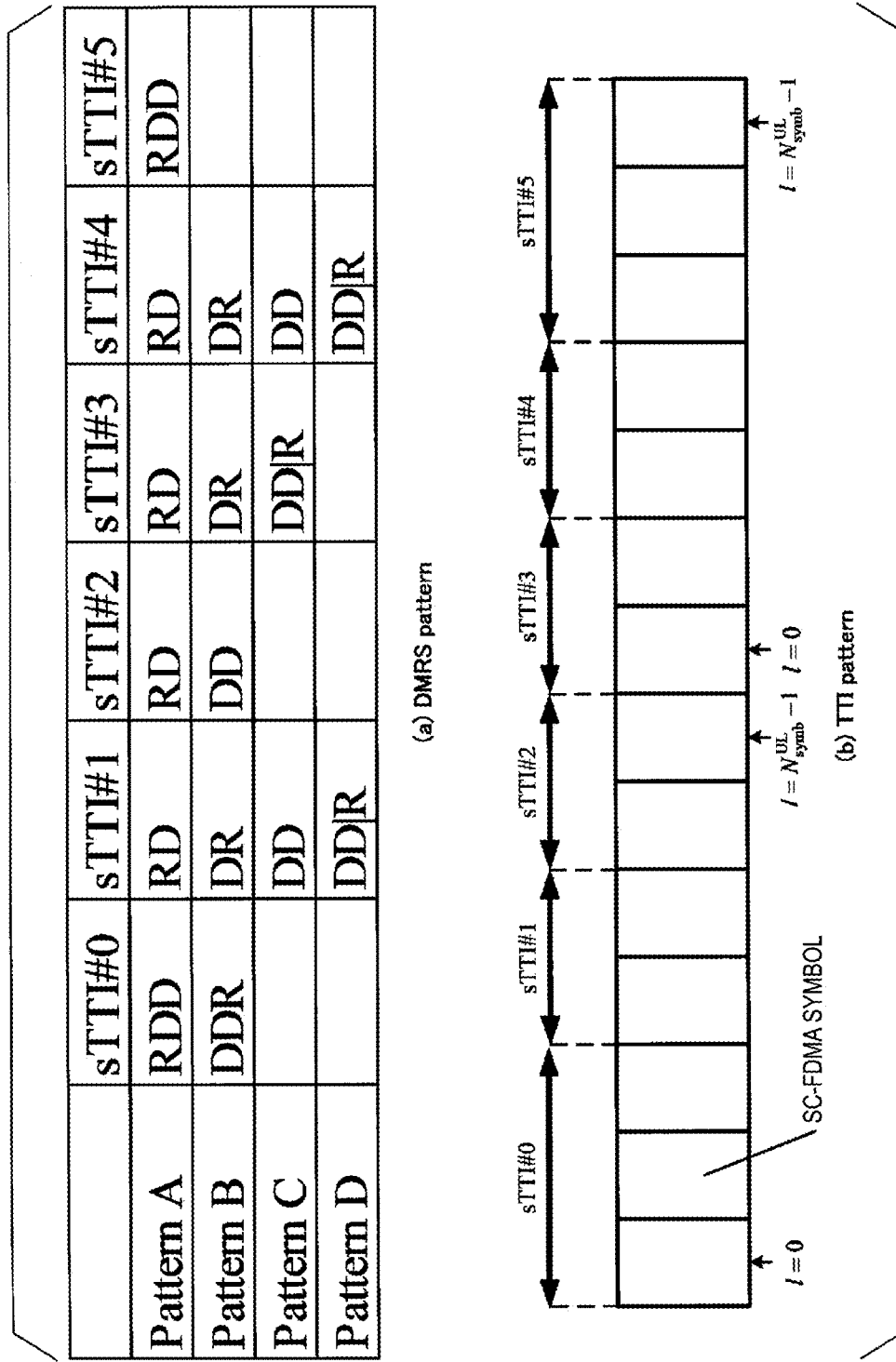
FIG. 5 is a diagram illustrating an example of DMRS patterns associated with an sPUSCH_short and TTI patterns for the sPUSCH_short according to one aspect of the present embodiment.

FIG. 5 is a diagram illustrating an example of DMRS patterns associated with the sPUSCH_short and TTI patterns for the sPUSCH_short according to one aspect of the present embodiment. Hereinafter, the patterns of the DMRS associated with the sPUSCH_short may include the SC-FDMA symbol index l to which the DMRS associated with the sPUSCH_short is mapped. FIG. 5(a) illustrates SC-FDMA symbol patterns in which a DMRS and data (sPUSCH_short) are mapped for each sTTI index (sTTI #0 to sTTI #5). In FIG. 5(a), R represents the SC-FDMA symbol to which the DMRS is mapped, and D represents the SC-FDMA symbol to which the sPUSCH_short is mapped. For example, a pattern A in sTTI #0 indicates that the DMRS is mapped to the first SC-FDMA symbol (l=0) and the sPUSCH_short is mapped to other SC-FDMA symbols (l=1, 2). "|" indicates sTTI boundary. For example, a pattern D of sTTI #1 indicates that the sPUSCH_short is mapped to the first and next SC-FDMA symbols (l=3, 4) of sTTI #1, and indicates that the DMRS is mapped to the first SC-FDMA symbol (l=5) of sTTI #2. In other words, the DMRS associated with the sPUSCH_short may not be included in the sTTI including the sPUSCH_short.

The DMRS mapping indication information may include information indicating any of patterns A, B, C, and D in FIG. 5(a). The DMRS mapping indication information may include information indicating patterns of SC-FDMA symbols to which the DMRS associated with the sPUSCH_short and/or the sPUSCH_short is mapped. The patterns of the SC-FDMA symbols to which the DMRS and the sPUSCH_short are mapped indicated by the DMRS mapping indication information may be given based at least on the index of the sTTI.

The DMRS mapping indication information may include at least two bits, with each bit value indicating a respective DMRS pattern. For example, in a case that the DMRS mapping indication information is '00', the pattern of the SC-FDMA symbols to which the DMRS and/or the sPUSCH_short is mapped may be indicated as the pattern A. In a case that the DMRS mapping indication information is '01', the pattern of the SC-FDMA symbols to which the DMRS and/or the sPUSCH_short is mapped may be indicated as a pattern B. In a case that the DMRS mapping indication information is '10', the pattern of the SC-FDMA symbols to which the DMRS and/or the sPUSCH_short is mapped may be indicated as a pattern C. In a case that the DMRS mapping indication information is '11', the pattern of the SC-FDMA symbols to which the DMRS and/or the sPUSCH_short is mapped may be indicated as the pattern D.

For example, in the patterns of the DMRS associated with the sPUSCH_short illustrated in FIG. 5, in a case that the DMRS mapping indication information included in the DCI for scheduling the sPUSCH_short of sTTI #0 indicates '10', or '11', a problem occurs that there is no pattern of the DMRS associated with the sPUSCH_short. Accordingly, '10' and '11' of the DMRS mapping indication information included in the DCI for scheduling the sPUSCH_short of sTTI #0 may be reserved. Alternatively, '10' and '11' of the DMRS mapping indication information included in the DCI for scheduling the sPUSCH_short of sTTI #0 may be replaced by a modulo operation as '00' and '01', respectively.

The pattern of the DMRS associated with the sPUSCH_short may be given based at least on the value $P_k$=mod $(P_{DCI}, N_p)$. Here, $P_{DCI}$ may be associated with the DMRS mapping information value indicated by the DCI. $P_{DCI}$ may be a decimal number value of the DMRS mapping information value indicated by the DCI. $N_p$ may be the number of the DMRS pattern candidates at a prescribed sTTI index. In an example illustrated in FIG. 5, $N_p$ may be 2 at sTTI #0, may be 4 at sTTI #1, may be 2 at sTTI #2, may be 3 at sTTI #3, may be 4 at sTTI #4, and may be 1 at sTTI #5. $N_p$ may be given based at least on the sTTI index. The pattern of the DMRS associated with the sPUSCH_short may be given based at least on a binary number value of the value $P_k$.

$l_{start}$ and/or $l_{end}$ in the baseband signal generation of the sPUSCH may be given based at least on the sTTI index. $l_{start}$ and/or $l_{end}$ in the baseband signal generation of the sPUSCH may be associated to the sTTI index. For example, $l_{start}$ and/or $l_{end}$ in the baseband signal generation of the sPUSCH_short may be $l_{start}$=0 and $l_{end}$=2 at sTTI #0. $l_{start}$ and/or $l_{end}$ in the baseband signal generation of the sPUSCH_short may be $l_{start}$=3 and $l_{end}$=4 at sTTI #1. $l_{start}$ and/or $l_{end}$ in the baseband signal generation of the sPUSCH_short may be $l_{start}$=5 and $l_{end}$=6 at sTTI #2. $l_{start}$ and/or $l_{end}$ in the baseband signal generation of the sPUSCH_short may be $l_{start}$=0 and $l_{end}$=1 at sTTI #3. $l_{start}$ and/or $l_{end}$ in the baseband signal generation of the sPUSCH_short may be $l_{start}$=2 and $l_{end}$=3 at sTTI #4. $l_{start}$ and/or $l_{end}$ in the baseband signal generation of the sPUSCH_short may be $l_{start}$=4 and $l_{end}$=6 at sTTI #5.

The number of SC-FDMA symbols constituting the PUSCH may be given based at least on $2\times(l_{end}-l_{start})$. The number of SC-FDMA symbols constituting the PUSCH may be a value including SC-FDMA symbols to which uplink reference signals associated with the PUSCH is mapped.

The number of SC-FDMA symbols constituting the PUSCH may be a value including SC-FDMA symbols to which the uplink reference signals (DMRS and SRS) are mapped. The number of SC-FDMA symbols constituting the PUSCH may be 14, 13, 12 or another value. The number of SC-FDMA symbols constituting the PUSCH may be greater than $N^{UL}_{symb}$.

The number of SC-FDMA symbols constituting the sPUSCH_slot may be given based at least on $l_{end}-l_{start}$. The number of SC-FDMA symbols constituting the sPUSCH_slot may be a value including SC-FDMA symbols to which uplink reference signals associated with the sPUSCH_slot is mapped. The number of SC-FDMA symbols constituting the sPUSCH_slot may be a value including SC-FDMA symbols to which the uplink reference signals (DMRS and SRS) are mapped. The number of SC-FDMA symbols constituting the sPUSCH_slot may include some or all of 4, 5, 6, and 7.

The number of SC-FDMA symbols constituting the sPUSCH_short may be given based at least on $l_{end}-l_{start}$. The number of SC-FDMA symbols constituting the sPUSCH_short may be a value including SC-FDMA symbols to which uplink reference signals associated with the sPUSCH_short is mapped. The number of SC-FDMA symbols constituting the sPUSCH_short may be a value including SC-FDMA symbols to which the uplink reference signals (DMRS and SRS) are mapped. The number of SC-FDMA symbols constituting the sPUSCH_short may include some or all of 1, 2, and 3.

The configuration of the downlink slot, the resource grid of the downlink slot, and the configuration of the downlink subframe are the same as those for the uplink, and thus descriptions thereof will be omitted.

The following downlink physical channels are used for downlink radio communication from the base station apparatus 3 to the terminal apparatus 1. The downlink physical channels are used for transmitting information output from the higher layer.

Physical Downlink Control Channel (PDCCH)
Enhanced Physical Downlink Control Channel (EPDCCH)
shortened Physical Downlink Control Channel (sPDCCH)
Physical Downlink Shared Channel (PDSCH)
shortened Physical Downlink Shared Channel (sPDSCH)

Hereinafter, the PDSCH and the sPDSCH are collectively referred to as a downlink shared channel. The PDCCH, the EPDCCH, and the sPDCCH are collectively referred to as a downlink control channel.

The PDCCH, the EPDCCH, and the sPDCCH are at least used for transmitting Downlink Control Information (DCI).

Figure 6:
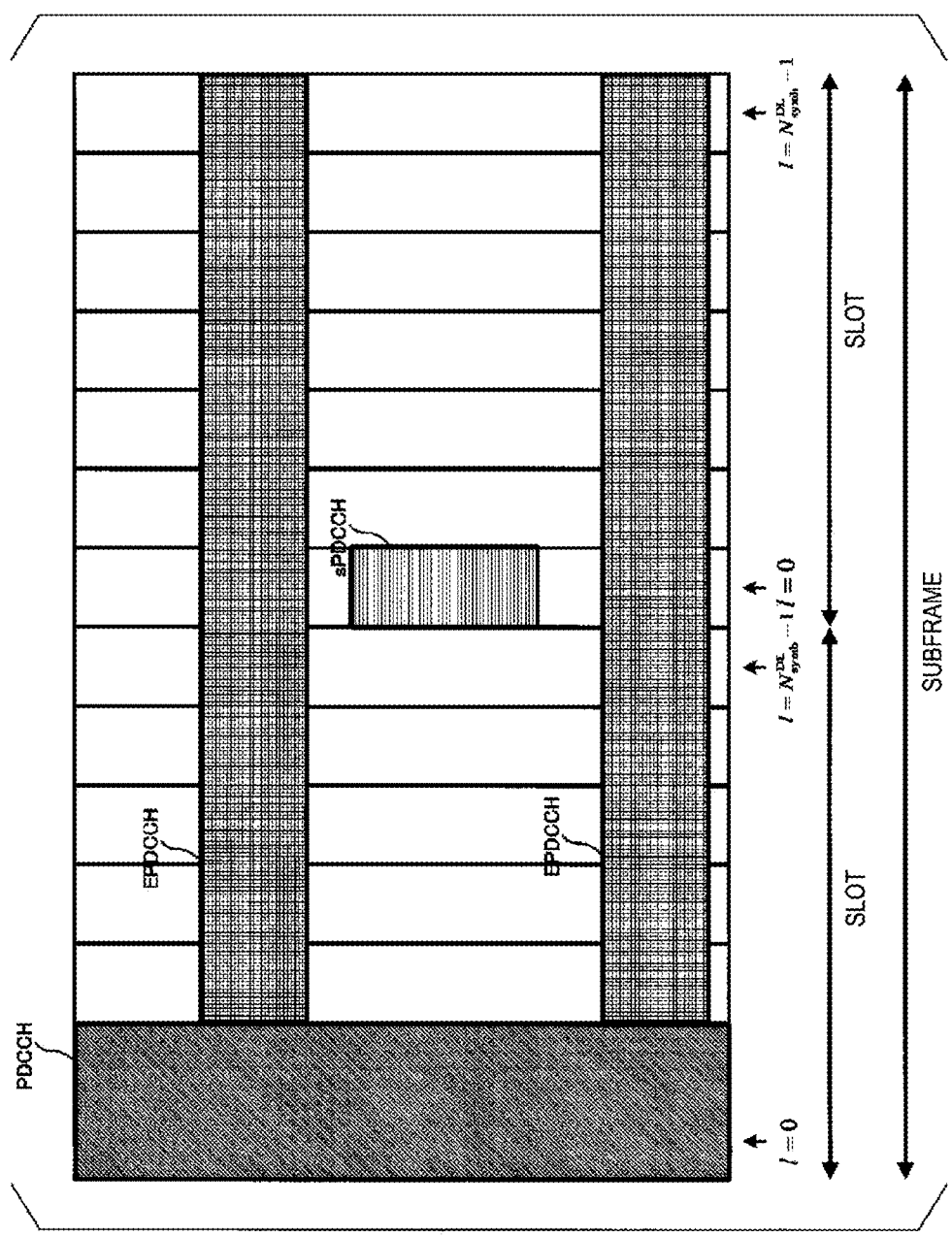
FIG. 6 is a diagram illustrating an example of mapping of a PDCCH, an EPDCCH, and an sPDCCH according to the present embodiment.

FIG. 6 is a diagram illustrating an example of mapping of the PDCCH, the EPDCCH, and the sPDCCH according to the present embodiment. $N^{DL}_{symb}$ is the number of OFDM symbols included in a downlink slot. In the downlink, l denotes the OFDM symbol index. In FIG. 6, the PDCCH is mapped to the $N_{PDCCH}$ OFDM symbols at the beginning of the subframe. Here, $N_{PDCCH}$ is any of the values of 1 to 4, and is indicated by a sequence transmitted by the PCFICH.

The PCFICH is a channel for transmitting information associated with the number of OFDM symbols used for transmission of one or more PDCCHs transmitted in the subframe.

The baseband signal of the EPDCCH is given based on the $l_{start}$ given by the PCFICH or higher layer signaling. At least in frame structure 1, the EPDCCH is mapped over the subframe.

The sPDCCH may be mapped for each sTTI. On the other hand, the sPDCCH may not be mapped to the sPDCCH at the beginning of the subframe.

The downlink control information includes scheduling information of the downlink and/or the uplink. The downlink control information is mapped by a prescribed format (DCI format) and is transmitted. The prescribed DCI format includes at least DCI format 0. DCI format 0 may be used at least for scheduling of the PUSCH.

DCI format 0 is at least used to transmit scheduling information of the uplink. DCI format 0 may include at least some or all of the following fields Z1 to Z4. (Field Z1) TPC command for scheduled PUSCH (Field Z2) Cyclic shift for DMRS and OCC index (Field Z3) Modulation and coding scheme and redundancy version (Field Z4) Resource block assignment and hopping resource allocation The field Z1 is a field used as a correction value for the transmit power for the PUSCH.

The field Z2 is at least used to determine the value of the cyclic shift applied to the DMRS associated with the PUSCH. The field Z2 is also referred to as a cyclic shift field. FIG. 7 is a diagram illustrating the relationship between the value of the field Z2 and the value $n^{(2)}_{DMRS, \lambda}$ and the value of OCC $[w^{(\lambda)}_{(0)}\ w^{(\lambda)}_{(1)}]$ used to determine the value of the cyclic shift applied to the DMRS, according to one aspect of the present embodiment. In FIG. 7, the field Z2 is including three bits, and, for example, in a case that the bits in the field Z2 indicate 000, the values of the first row in FIG. 7 are used. Here, $\lambda$ is a value indicating an index of the transmission layer.

The field Z3 is a field at least used for one or both of a configuration of the modulation scheme and the coding rate of the PUSCH and/or a configuration of the redundancy version.

The field Z4 is a value used at least for resource allocation of the PUSCH in the frequency domain. The unit of the resource allocation of the PUSCH may be one or multiple physical resource blocks. The unit of the resource allocation of the PUSCH may be given based at least on the operation band. The field Z4 is also referred to as a Resource block assignment field.

The prescribed DCI format may include at least DCI format 0s that is at least used for scheduling of the sPUSCH_slot and/or the sPUSCH_short.

DCI format 0s may include at least some or all of the fields Z1 to Z4. DCI format 0s may include at least some or all of the following fields Z5 to Z8.

(Field Z5) HARQ process number
(Field Z6) Modulation and coding scheme
(Field Z7) Redundancy version
(Field Z8) DMRS mapping indication information field The field Z5 may be a field that is at least used to indicate the HARQ process number of the sPUSCH.

The field Z6 may be a field at least used to configure the modulation scheme and the coding rate of the PUSCH.

The field Z7 may be a field that is at least used to indicate the redundancy version.

The field Z8 may be a field including the DMRS mapping indication information. A mapping of the DMRS and the sPUSCH_short may be indicated by the field Z8.

In a case that the terminal apparatus 1 is configured by the higher layer to decode the PDCCH and/or the EPDCCH with a Cyclic Redundancy Check (CRC) scrambled with the C-RNTI, the terminal apparatus 1 at least decodes DCI format 0 and transmits the PUSCH corresponding to DCI format 0, based at least on the generation of the transport block corresponding to the HARQ process number of the PUSCH transmission. The initialization of the scrambling of the PUSCH is given by the C-RNTI.

In a case that the terminal apparatus 1 is configured by the higher layer to decode the PDCCH and/or the EPDCCH with a CRC scrambled with the C-RNTI, the terminal apparatus 1 may at least decode DCI format 0s, and may transmit the sPUSCH corresponding to DCI format 0s in a case that the transport block corresponding to the HARQ process number for the sPUSCH transmission is generated. The initialization of the scrambling of the sPUSCH may be given by the C-RNTI.

In a case that the terminal apparatus 1 is configured by the higher layer to decode the sPDCCH with a CRC scrambled with the C-RNTI, the terminal apparatus 1 may at least decode DCI format 0s, and may transmit the sPUSCH corresponding to DCI format 0s in a case that the transport block corresponding to the HARQ process number for the sPUSCH transmission is generated. The initialization of the scrambling of the sPUSCH may be given by the C-RNTI.

The terminal apparatus 1 performs transmission of the PUSCH in subframe $n+k_1$, based at least on the fact that the PDCCH and/or the EPDCCH with DCI format 0 for the terminal apparatus 1 is detected in subframe n and the transport block corresponding to the HARQ process number of the PUSCH transmission is generated. $k_1$ may be 3 in a case that the shortening processing function is configured in the terminal apparatus 1 and satisfies a prescribed condition, or may be 4 otherwise. The shortening processing function is a function to shorten the time from when the PDSCH is received until the HARQ-ACK is transmitted, and/or the time from when DCI format is received until the PUSCH is transmitted.

The terminal apparatus 1 may perform transmission of the sPUSCH in subframe $n+k_{s1}$, based at least on the fact that the PDCCH and/or the EPDCCH with DCI format 0s for the terminal apparatus 1 is detected in subframe n and the transport block corresponding to the HARQ process number of the sPUSCH transmission is generated. $k_{s1}$ may be given in the unit of sTTI.

The terminal apparatus 1 may perform the transmission of the PUSCH in subframe $n_s+k_{s2}$, based at least on the fact that the sPDCCH with DCI format 0s for the terminal apparatus 1 is detected at the sTTI index $n_s$ and the transport block corresponding to the HARQ process number of the sPUSCH transmission is generated. $k_{s2}$ may be given in the unit of sTTI.

In a case that the terminal apparatus 1 is configured by the higher layer to decode the PDCCH and/or the EPDCCH with a CRC scrambled with the SPS-C-RNTI, the terminal apparatus 1 at least decodes DCI format 0 and transmits the PUSCH corresponding to DCI format 0, based at least on the generation of the transport block corresponding to the HARQ process number of the PUSCH transmission. The initialization of the scrambling of the PUSCH is given by the SPS-C-RNTI. The initialization of the scrambling of the PUSCH retransmission is given by the SPS-C-RNTI. The initialization of the scrambling of the initial transmission of the PUSCH that does not correspond to the PDCCH and/or the EPDCCH is given by the SPS-C-RNTI. The SPS-C-RNTI may include an UL-V-SPS-RNTI.

The SPS C-RNTI may be at least used to indicate generation of a semi-persistent (or periodic) uplink grant. The SPS C-RNTI may be at least used for scheduling of the semi-persistent PUSCH. The DCI format with a CRC scrambled with the SPS C-RNTI may schedule the semi-persistent PUSCH. The semi-persistent uplink grant may correspond to the semi-persistent PUSCH.

In a case that the terminal apparatus 1 is configured by the higher layer to decode the PDCCH and/or the EPDCCH with a CRC scrambled with the SPS-C-RNTI, the terminal apparatus 1 may at least decode DCI format 0s, and may transmit the sPUSCH corresponding to DCI format 0s in a case that the transport block corresponding to the HARQ process number for the sPUSCH transmission is generated. The initialization of the scrambling of the sPUSCH may be given by the SPS-C-RNTI. The initialization of the scrambling of the sPUSCH retransmission may be given by the SPS-C-RNTI. The initialization of the scrambling of the initial transmission of the sPUSCH that does not correspond to the PDCCH and/or the EPDCCH may be given by the SPS-C-RNTI.

In a case that the terminal apparatus 1 is configured by the higher layer to decode the sPDCCH with the CRC scrambled with the SPS-C-RNTI, the terminal apparatus 1 may at least decode DCI format 0s, and may transmit the sPUSCH corresponding to DCI format 0s in a case that the transport block corresponding to the HARQ process number for the sPUSCH transmission is generated. The initialization of the scrambling of the sPUSCH is given by the SPS-C-RNTI. The initialization of the scrambling of the sPUSCH retransmission may be given by the SPS-C-RNTI. The initialization of the scrambling of the initial transmission of the sPUSCH that does not corresponding to the sPDCCH may be given by the SPS-C-RNTI.

The terminal apparatus 1 enables a first SPS assignment and/or a second SPS assignment only in a case that all of the following conditions A1 to A2 are satisfied. (Condition A1) the CRC sequence given for a payload of the downlink control information included in the PDCCH and/or the EPDCCH is scrambled with the SPS-C-RNTI (Condition A2) a new data indicator included in the PDCCH and/or the EPDCCH is set to 0

In the condition A2, in a case that the DCI format detected in the PDCCH and/or the EPDCCH is either DCI format 2, 2A, 2B, 2C, or 2D, the new data indicator refers to a new data indicator for the transport block being enabled out of two transport blocks.

Enabling of the first SPS assignment is accomplished based at least on the fact that the condition A1 and the condition A2 are satisfied and each of the first set of fields included in the DCI format is set to a prescribed value. In a case that the enabling of the first SPS assignment is accomplished, the terminal apparatus 1 assumes that DCI format information is effective as the first SPS activation.

Based at least on the fact that the condition A1 and the condition A2 are satisfied and one of the first set of fields included in the DCI format is at least not set to a prescribed value, it is assumed that the CRC added to the DCI format does not match.

Error detection of the DCI format is given based at least on the CRC. The CRC not matching may indicate that a DCI format error with the CRC is detected.

The first set for the first SPS assignment is given based at least on the type of the DCI format. For example, in a case that the DCI format is DCI format 0, the first set includes at least some or all of the field Z1, the field Z2, and the field Z3. In the first set, the field Z1 is set to '00', and in a case that the field Z2 is included in the DCI format, the field Z2 is set to '000', and the most significant bit of the field Z3 is set to '0'. The most significant bit may be the most significant bit in binary number.

In a case that the condition A1 and condition A2 are satisfied and each of the second set of fields included in the DCI format is set to a prescribed value, then enabling of the second SPS assignment is accomplished. In a case that the enabling of the second SPS assignment is accomplished, the terminal apparatus 1 assumes that the DCI format information is effective as the SPS release.

Based at least on the fact that the condition A1 and the condition A2 are satisfied and one of the second set of fields included in the DCI format is at least not set to a prescribed value, it is assumed that the CRC added to the DCI format does not match.

The second set for the second SPS assignment is given based at least on the type of the DCI format. For example, in a case that the DCI format is DCI format 0, the second set includes at least some or all of the field Z1, the field Z2, the field Z3, and the field Z4. In the first set, the field Z1 is set to '00', and in a case that the field Z2 is included in the DCI format, the field Z2 is set to '000', the field Z3 is set to '11111', and the field Z4 all are set to one.

The terminal apparatus 1 may enable the third SPS assignment and/or the fourth SPS assignment only in a case that at least some or all of the following conditions A3 to A4 are satisfied. (Condition A3) the CRC sequence given for the payload of the downlink control information included in the PDCCH, the EPDCCH, and/or the sPDCCH is scrambled with a prescribed RNTI (Condition A4) a new data indicator included in the PDCCH, the EPDCCH, and/or the sPDCCH is set to 0.

In the condition A3, the prescribed RNTI may be the SPS-C-RNTI. In the condition A3, the prescribed RNTI may be an SPS-C-RNTI given for sTTI operations. The SPS-RNTI in the condition A1 may be an SPS-C-RNTI given for TTI operations. The sTTI operations may include an operation of transmitting at least the sPUSCH.

In a case that the condition A3 and condition A4 are satisfied and each of the third set of fields included in the DCI format is set to a prescribed value, then enabling of the third SPS assignment is accomplished. In a case that the enabling of the third SPS assignment is accomplished, the terminal apparatus 1 may assume that the DCI format information is effective as the second SPS activation.

Based at least on the fact that the condition A3 and the condition A4 are satisfied and one of the third set of fields included in the DCI format is at least not set to a prescribed value, it may be assumed that the CRC added to the DCI format does not match. Based at least on the fact that the condition A3 and the condition A4 are satisfied and the field Z8 included in the DCI format is at least not set to a prescribed value, it may be assumed that the CRC added to the DCI format does not match.

The third set for the third SPS assignment may be given based at least on the type of the DCI format. For example, in a case that the DCI format is DCI format 0s, the third set may include at least some or all of the field Z1, the field Z2, the field Z3, the field Z5, the field Z6, the field Z7, and the field Z8. In the third set, at least a part of the bits of the field Z1 may be configured to a prescribed value, and the prescribed value may be '00'. In the third set, at least a part of the bits of the field Z2 may be set to a prescribed value, and the prescribed value may be '000'. In the third set, at least a part of the bits of the field Z3 may be set to a prescribed value, and, for example, the most significant bit of the field Z3 may be set to '0'. In the third set, at least a part of the bits of the field Z5 may be set to a prescribed value, and, for example, all bits of the field Z5 may be set to '0' in the third set. In the third set, at least a part of the bits of the field Z6 may be set to a prescribed value, and, for example, the most significant bit of the field Z6 may be set to '0'. In the third set, at least a part of the bits of the field Z7 may be set to a prescribed value, and, for example, the prescribed value may be '00'. In the fourth set, at least a part of the bits of the field Z8 may be set to a prescribed value, and the prescribed value may be '00'. The field Z8 may be set to trigger the DMRS mapping of the pattern A (or indicate the DMRS mapping of the pattern A).

In a case that the condition A3 and condition A4 are satisfied and each of the fourth set of fields included in the DCI format is set to a prescribed value, then enabling of the fourth SPS assignment may be accomplished. In a case that the enabling of the fourth SPS assignment is accomplished, the terminal apparatus 1 may assume that the DCI format information is effective as the SPS release.

Based at least on the fact that the condition A3 and the condition A4 are satisfied and one of the fourth set of fields included in the DCI format is at least not set to a prescribed value, it may be assumed that the CRC added to the DCI format does not match. Based at least on the fact that the condition A3 and the condition A4 are satisfied and the field Z8 included in the DCI format is at least not set to a prescribed value, it may be assumed that the CRC added to the DCI format does not match.

The fourth set for the fourth SPS assignment may be given based at least on the type of the DCI format. For example, in a case that the DCI format is DCI format 0s, the fourth set may include at least some or all of the field Z1, the field Z2, the field Z3, the field Z4, the field Z5, the field Z6, the field Z7, and the field Z8. In the fourth set, at least a part of the bits of the field Z1 may be configured to a prescribed value, and the prescribed value may be '00'. In the fourth set, at least a part of the bits of the field Z2 may be set to a prescribed value, and the prescribed value may be '000'. In the fourth set, at least a part of the bits of the field Z3 may be set to a prescribed value, and, for example, the prescribed value may be '11111'. In the fourth set, at least a part of the bits of the field Z4 may be set to a prescribed value, and, for example, all of the field Z4 may be set to one. In the fourth set, at least a part of the bits of the field Z5 may be set to a prescribed value, and, for example, all bits of the field Z5 may be set to '0' in the fourth set. In the fourth set, at least a part of the bits of the field Z6 may be set to a prescribed value, and, for example, all of the prescribed value may be set to 1. In the fourth set, at least a part of the bits of the field Z7 may be set to a prescribed value, and, for example, the prescribed value may be '00'. In the fourth set, at least a part of the bits of the field Z8 may be set to a prescribed value, and the prescribed value may be '00'. The field Z8 may correspond to bits to triggers the DMRS mapping of the pattern A (or indicate the DMRS mapping of the pattern A).

Hereinafter, description is given of an example of operation in a case that the terminal apparatus 1 assumes that the DCI format is effective as the SPS activation in the uplink.

In a case that the terminal apparatus 1 assumes that the DCI format is effective as the first SPS activation, the terminal apparatus 1 initializes (or configures, reinitializes, or reconfigures) the Configured uplink grant. Here, the PDCCH including the DCI format may be a PDCCH received in a special cell. In a case that the terminal apparatus 1 assumes that the DCI format is effective as the first SPS activation and SkipUplinkTxSPS is configured for the terminal apparatus 1, SPS confirmation is triggered. SkipUplinkTxSPS is used to configure whether or not to skip configured uplink transmission for the uplink grant by the terminal apparatus 1 in a case of absence of the data used for the uplink transmission in the terminal apparatus 1. The uplink grant and the configured uplink grant are also referred to collectively as an uplink grant.

The special cell includes at least a primary cell. The special cell may further include a PUCCH cell. The PUCCH cell may be a cell in which the PUCCH resource is configured.

After the configured uplink grant is configured, the N-th configured uplink grant is given by a set of System Frame Number (SFN) and the subframe illustrated in Equation (1) below.

$$(10*SFN+\text{subframe}) = \text{mod}((10*SFN_{starttime}+\text{subframe}_{starttime})+N*\text{semiPersis tSchedIntervalUL}+\text{Subframe\_Offset}*\text{mod}(N,2), 10240) \quad \text{Equation 1}$$

Here, $SFN_{start\ time}$ is an SFN in which the configured uplink grant is configured, and $\text{subframe}_{start\ time}$ is a subframe in which the configured uplink grant is configured. SemiPersistSchedIntervalUL is a value configured by the higher layer and is defined as the number of subframes. Subframe_Offset is 0 in a case that a prescribed configuration is not configured for the terminal apparatus 1.

In a case that the SPS confirmation is triggered and not canceled and the uplink resource assigned for the new transmission (initial transmission) is given, generation of SPS confirmation is instructed to be generated.

In a case that the terminal apparatus 1 assumes that the DCI format is effective as the second SPS activation, the terminal apparatus 1 may initialize (or configure, reinitialize, or reconfigure) the Configured uplink grant. Here, the PDCCH including the DCI format may be a PDCCH received in a special cell. In a case that the terminal apparatus 1 assumes that the DCI format is effective as the second SPS activation and SkipUplinkTxSPS is configured for the terminal apparatus 1, SPS confirmation may be triggered. For each of a case that the terminal apparatus 1 assumes that the DCI format is effective as the first SPS activation and a case that the terminal apparatus 1 assumes that the DCI format is effective as the second SPS activation, SkipUplinkTxSPS may be configured individually. In a case that the terminal apparatus 1 assumes that the DCI format is effective as the first SPS activation, SkipUplinkTxSPS may be configured in case that the value of SemiPersistSchedIntervalUL is smaller than 10. In a case that the terminal apparatus 1 assumes that the DCI format is effective as the second SPS activation, SkipUplinkTxSPS may be given based at least on the value of SemiPersistSchedIntervalUL_sTTI.

After the configured uplink grant is configured, the N-th configured uplink grant may be given by a set of the SFN, the subframe, and the sTTI index as indicated by the following Equation (2).

$$(10*SFI+\text{subframe}+\text{sTTI\_index}) = \text{mod}(10*SFN_{starttime}+\text{subframe}_{starttime}+\text{STTI\_index}_{starttime})+N*\text{semiPersistedInterval}\ \text{UL}+\text{sTTI\_Offset}*\text{mod}(N,2), 10240) \quad \text{Equation 2}$$

Here, sTTI_index may be an index of the sTTI in a subframe. $\text{sTTI\_index}_{start\ time}$ may be a sTTI index in which the configured uplink grant is configured. sTTI_Offset may be 0.

Figure 8:
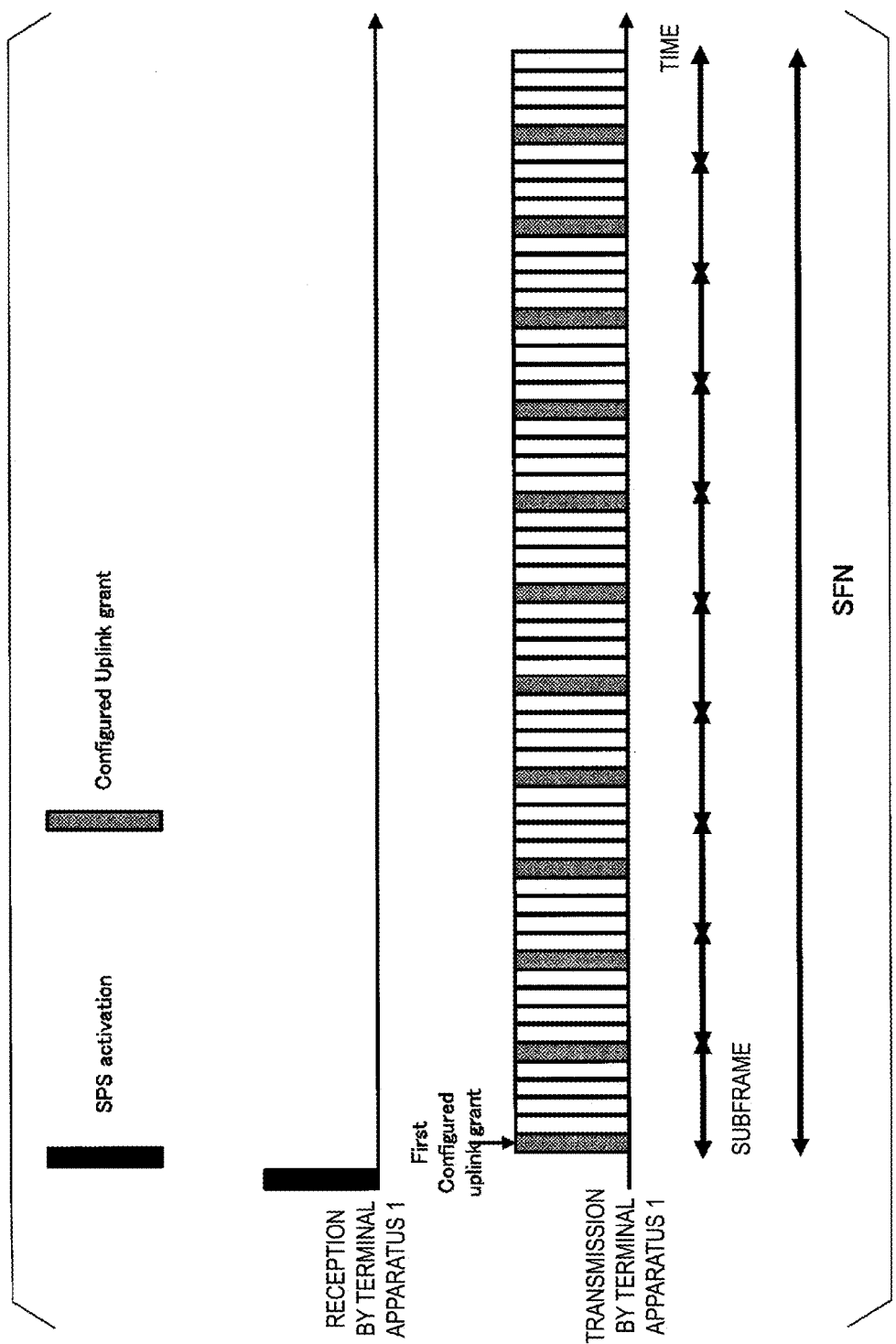
FIG. 8 is a diagram illustrating an example of configured uplink grants in a case that a terminal apparatus 1 assumes that a DCI format is effective as a second SPS activation, according to one aspect of the present embodiment.

FIG. 8 is a diagram illustrating an example of configured uplink grants in a case that the terminal apparatus 1 assumes that the DCI format is effective as the second SPS activation, according to one aspect of the present embodiment. In FIG. 8, the second SPS activation is configured based at least on the DCI format of the PDCCH, the EPDCCH, and/or the sPDCCH received by the terminal apparatus. In FIG. 8, uplink grants configured based on the SFN, the subframe, and/or the sTTI index for receiving the PDCCH, the EPDCCH, and/or the sPDCCH are periodically configured.

In an example illustrated in FIG. 8, an example is illustrated in which the PUSCH_short is configured for the terminal apparatus 1, and six sTTIs are configured for one subframe. In FIG. 8, the uplink grant (N=0) first configured based on the SFN, the subframe, and/or the sTTI index for receiving the PDCCH, the EPDCCH, and/or the sPDCCH is also referred to as the first configured uplink grant.

The pattern of the sPUSCH_short and the DMRS associated with the sPUSCH_short for the first configured uplink grant may be given based at least on DCI format information for the second SPS activation. On the other hand, an indication of the pattern of the sPUSCH_short and the DMRS associated with the sPUSCH_short other than the first configured uplink grant may be given based at least on higher layer signaling.

In a case that a normal CP is configured in the terminal apparatus 1 and a CRC added to the DCI format at least used for scheduling the PUSCH is scrambled with the C-RNTI, the SC-FDMA symbol index l to which the DMRS associated with the PUSCH is mapped may be l=4.

In a case that an extended CP is configured in the terminal apparatus 1 and a CRC added to the DCI format at least used for scheduling the PUSCH is scrambled with the C-RNTI, the SC-FDMA symbol index l to which the DMRS associated with the PUSCH is mapped may be l=3.

In a case that a normal CP is configured in the terminal apparatus 1 and a CRC added to the DCI format at least used for scheduling the PUSCH is scrambled with the SPS C-RNTI, the SC-FDMA symbol index l to which the DMRS associated with the PUSCH is mapped may be l=4. The PUSCH may correspond to the configured uplink grant given based at least on the DCI format.

In a case that an extended CP is configured in the terminal apparatus 1 and a CRC added to the DCI format at least used for scheduling the PUSCH is scrambled with the SPS C-RNTI, the SC-FDMA symbol index l to which the DMRS associated with the PUSCH is mapped may be l=3. The PUSCH may correspond to the configured uplink grant given based at least on the DCI format.

In a case that a CRC added to the DCI format at least used for scheduling the sPUSCH_slot is scrambled with the C-RNTI, the SC-FDMA symbol index l to which the DMRS associated with the sPUSCH_slot is mapped may be l=4.

In a case that a CRC added to the DCI format at least used for scheduling the sPUSCH_slot is scrambled with the SPS C-RNTI, the SC-FDMA symbol index l to which the DMRS associated with the sPUSCH_slot is mapped may be l=4. The sPUSCH_slot may correspond to the configured uplink grant given based at least on the DCI format.

In a case that a CRC added to the DCI format at least used for scheduling the sPUSCH_short is scrambled with the C-RNTI, the pattern of the DMRS associated with the sPUSCH_short may be given based at least on the DMRS mapping information included in the DCI format.

In a case that a CRC added to the DCI format at least used for scheduling the sPUSCH_short is scrambled with the SPS C-RNTI, the pattern of the DMRS associated with the sPUSCH_short may be given based at least on higher layer signaling and/or a prescribed rule. The sPUSCH_short may correspond to the configured uplink grant given based at least on the DCI format.

The higher layer signaling may be signaling used in an RRC layer. The higher layer signaling may be transmitted in the PDSCH and/or the sPDSCH. The higher layer signaling may include at least the DMRS mapping indication information. The higher layer signaling may include at least the DMRS mapping indication information. The higher layer signaling may include at least information indicating the SC-FDMA symbol index l to which the DMRS associated with the PUSCH corresponding to the configured uplink grant is mapped. The DMRS mapping indication information included in the DCI format may include at least information indicating the SC-FDMA symbol index l to which the DMRS associated with the PUSCH scheduled by the DCI format is mapped.

The prescribed rule may include a static configuration. The prescribed rule may be information provided in advance in the terminal apparatus 1 and/or the base station apparatus 3. The prescribed rule may be given based on descriptions of specifications.

In a case that a CRC added to the DCI format at least used for scheduling of the sPUSCH_short is scrambled with the SPS C-RNTI, the pattern of the DMRS associated with the sPUSCH_short corresponding to the first configured uplink grant may be at least given to the DMRS mapping information included in the DCI format. On the other hand, in a case that a CRC added to the DCI format at least used for scheduling of the sPUSCH_short is scrambled with SPS C-RNTI, the pattern of the DMRS associated with the sPUSCH_short corresponding to the configured uplink grants other than the first configured uplink grant may be given based at least on higher layer signaling and/or the prescribed rule. The configured uplink grants other than the first configured uplink grant may be the configured uplink grants for which the SPS confirmation is triggered in a case that SkipUplinkTxSPS is configured to the terminal apparatus 1. The first configured uplink grant may be the configured uplink grant corresponding to N=0.

In a case that a CRC added to the DCI format at least used for scheduling of the sPUSCH_short is scrambled with the SPS C-RNTI, the pattern of the DMRS associated with the sPUSCH_short may be given based at least on the value $N_{DCI}$ and mod ($N_{DCI}$, $N_p$) given based at least on the DMRS mapping information included in the DCI format. The sPUSCH_short may correspond to the configured uplink grant given based at least on the DCI format. Here, $N_p$ may be a candidate number of the DMRS patterns at a prescribed sTTI index. The prescribed sTTI index may be an sTTI index at which the sPUSCH_short is transmitted. The prescribed sTTI index may be given for each of the configured uplink grants.

In a case that a CRC added to the DCI format at least used for scheduling of the sPUSCH_short is scrambled with the SPS C-RNTI, the SC-FDMA symbol index l to which the DMRS associated with the sPUSCH_short is mapped may be smaller than all SC-FDMA symbol indices l to which the sPUSCH_short is mapped. In a case that a CRC added to the DCI format at least used for scheduling of the sPUSCH_short is scrambled with the SPS C-RNTI, the SC-FDMA symbol index l to which the DMRS associated with the sPUSCH_short is mapped may be smaller than $l_{start}$ for the SC-FDMA symbol to which the sPUSCH_short is mapped.

In a case that the condition A3 and condition A4 are satisfied and each of the third set included in the DCI format is set to a prescribed value, the terminal apparatus 1 may assume that enabling of the third SPS assignment is accomplished. In a case that the enabling of the third SPS assignment is accomplished, the terminal apparatus 1 may assume that the DCI format information is effective as the second SPS activation.

In a case that the DCI format is a DCI format at least used for scheduling of the sPUSCH_slot, the third set may not include at least the field Z8.

In a case that the DCI format is a DCI format at least used for scheduling of the sPUSCH_slot, the third set may include at least some or all of the field Z1, the field Z2, the field Z5, the field Z6, and the field Z7.

In a case that the DCI format is a DCI format at least used for scheduling of the sPUSCH_short, the third set may include at least the field Z8. The field Z8 may be set to indicate the pattern A.

In a case that the DCI format is a DCI format at least used for scheduling of the sPUSCH_short, the third set may include at least some or all of the field Z1, the field Z2, the field Z5, the field Z6, the field Z7, and the field Z8. The field Z8 may be set to indicate the pattern A.

Other aspects of the present embodiment will be described as follows.

The prescribed DCI format may include DCI format X. DCI format X may be used at least for scheduling of the PUSCH. DCI format X may include at least some or all of the fields Z1 to Z8. DCI format X may include at least some or all of the following fields Z9 to Z11. (Field Z9) the starting position ($l_{start}$) of the DFT-s-OFDM symbol to which the PUSCH is mapped (Field Z10) the duration ($l_{duration}$) of the DFT-s-OFDM symbol to which the PUSCH is mapped (Field Z11) the termination position ($l_{end}$) of the DFT-s-OFDM symbol to which the PUSCH is mapped Here, $l_{duration}$ may be $l_{duration}=l_{end}-l_{start}$. Some or all of the field Z9 to the field Z11 may be used at least for resource mapping of the PUSCH. The resource mapping of the PUSCH may be given based at least on some or all of $l_{start}$, $l_{duration}$, and $l_{end}$. The resource mapping of the PUSCH may include at least some or all of $l_{start}$, $l_{duration}$, and $l_{end}$.

In a case that a CRC added to the DCI format at least used for scheduling of the PUSCH is scrambled with the C-RNTI, the resource mapping of the PUSCH may be given based at least on some or all of the field Z9 to the field Z11 included in the DCI format.

In a case that a CRC added to the DCI format at least used for scheduling of the PUSCH is scrambled with the SPS C-RNTI, the resource mapping of the PUSCH may be given based at least on higher layer signaling and/or the prescribed rule. The PUSCH may correspond to the configured uplink grant given based at least on the DCI format.

In a case that a CRC added to the DCI format at least used for scheduling of the PUSCH is scrambled with the SPS C-RNTI, the resource mapping of the PUSCH corresponding to the first configured uplink grant may be given to at least some or all of the field Z9 to the field Z11 included in the DCI format. On the other hand, in a case that a CRC added to the DCI format at least used for scheduling of the PUSCH is scrambled with the SPS C-RNTI, the resource mapping of the PUSCH corresponding to the configured uplink grants other than the first configured uplink grant may be given based at least on higher layer signaling and/or the prescribed rule. The configured uplink grants other than the first configured uplink grant may be the configured uplink grants for which the SPS confirmation is triggered in a case that SkipUplinkTxSPS is configured to the terminal apparatus 1. The first configured uplink grant may be the configured uplink grant corresponding to N=0.

In a case that the condition A1 and condition A2 are satisfied and each of the first set included in the DCI format is set to a prescribed value, then the terminal apparatus 1 may assume that enabling of the first SPS assignment is accomplished. In a case that the enabling of the first SPS assignment is accomplished, the terminal apparatus 1 may assume that the DCI format information is effective as the first SPS activation.

The first set may include at least some or all of the field Z9 to the field Z11. In a case that at least some or all of the field Z9 to the field Z11 are included in the first set, the resource mapping of the PUSCH corresponding to the configured uplink grant initialized based at least on the first SPS activation may be given based on at least some or all of the field Z9 to the field Z11.

In a case that the condition A3 and condition A4 are satisfied and each of the third set included in the DCI format is set to a prescribed value, the terminal apparatus 1 may assume that enabling of the third SPS assignment is accomplished. In a case that the enabling of the third SPS assignment is accomplished, the terminal apparatus 1 may assume that the DCI format information is effective as the second SPS activation.

The third set may include at least some or all of the field Z9 through the field Z11. In a case that at least some or all of the field Z9 to the field Z11 are included in the third set, the resource mapping of the PUSCH corresponding to the configured uplink grant initialized based at least on the second SPS activation may be given based on at least some or all of the field Z9 to the field Z11.

An apparatus configuration of the terminal apparatus 1 according to one aspect of the present invention will be described below.

Figure 9:
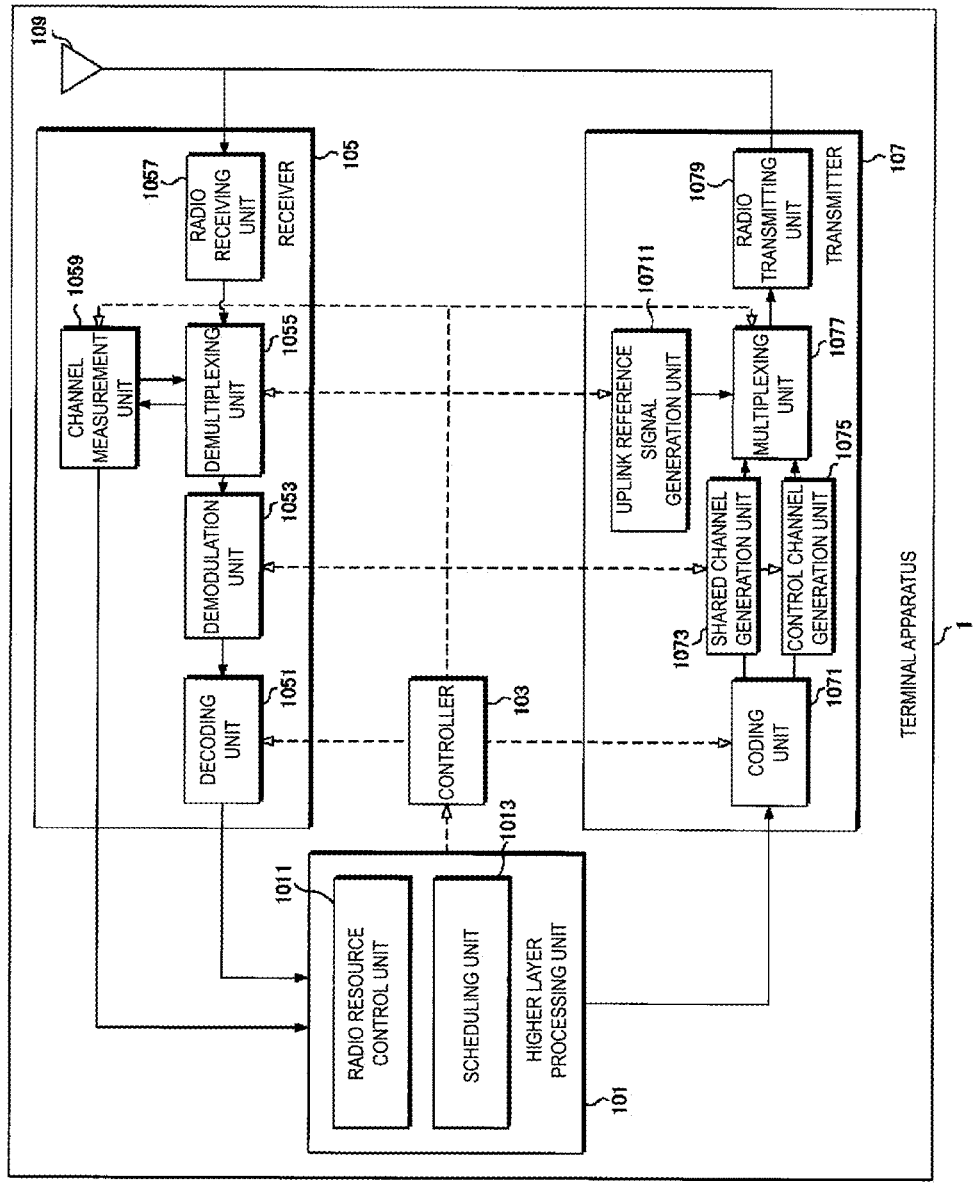
FIG. 9 is a schematic block diagram illustrating a configuration of a terminal apparatus 1 according to one aspect of the present embodiment.

FIG. 9 is a schematic block diagram illustrating a configuration of the terminal apparatus 1 according to one aspect of the present embodiment. As illustrated, the terminal apparatus 1 includes at least some or all of a higher layer processing unit 101, a controller 103, a receiver 105, a transmitter 107, and a transmit and receive antenna 109. The higher layer processing unit 101 includes at least one of a radio resource control unit 1011 and a scheduling unit 1013. The receiver 105 includes at least one of a decoding unit 1051, a demodulation unit 1053, a demultiplexing unit 1055, a radio receiving unit 1057, and a channel measurement unit 1059. The transmitter 107 includes at least one of a coding unit 1071, a shared channel generation unit 1073, a control channel generation unit 1075, a multiplexing unit 1077, a radio transmitting unit 1079, an uplink reference signal generation unit 10711.

The higher layer processing unit 101 outputs, to the transmitter 107, the uplink data generated by a user operation or the like. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. The higher layer processing unit 101 generates control information to control the receiver 105 and the transmitter 107, based on downlink control information and the like received on the control channel, and outputs the generated information to the controller 103. The higher layer processing unit is provided with at least a function of processing received higher layer signaling.

The radio resource control unit 1011 included in the higher layer processing unit 101 manages various pieces of configuration information of the terminal apparatus 1. For example, the radio resource control unit 1011 manages the configured serving cell. The radio resource control unit 1011 generates information to be mapped to each uplink channel, and outputs the generated information to the transmitter 107. In a case of successfully decoding the received downlink data, the radio resource control unit 1011 generates an ACK, outputs the ACK to the transmitter 107, and in a case that decoding of the received downlink data is failed, the radio resource control unit 1011 generates a NACK, and outputs the NACK to the transmitter 107.

The scheduling unit 1013 included in the higher layer processing unit 101 stores the downlink control information received via the receiver 105. The scheduling unit 1013 controls the transmitter 107 via the controller 103 so as to transmit the PUSCH in accordance with the received uplink grant in the subframe four subframes after the subframe in which the uplink is received. The scheduling unit 1013 controls the receiver 105 via the controller 103 so as to receive the shared channel according to the received downlink grant in the subframe in which the downlink grant is received.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the decoded information to the higher layer processing unit 101.

The radio receiving unit 1057 orthogonally demodulates the downlink signal received via the transmit and receive antenna 109, and converts the orthogonally-demodulated analog signal to a digital signal. For example, the radio receiving unit 1057 may perform Fast Fourier Transform (FFT) on the digital signal and extract a signal in the frequency domain.

The demultiplexing unit 1055 demultiplexes the extracted signal into some or all of the downlink control channel, the downlink shared channel, and the reference signal. The demultiplexing unit 1055 outputs, to the channel measurement unit 1059, the reference signal resulting from the demultiplexing.

The demodulation unit 1053 demodulates the downlink control channel and the downlink shared channel with respect to a modulation scheme such as QPSK, 16 Quadrature Amplitude Modulation (QAM), 64QAM, and the like, and outputs the result of the demodulation to the decoding unit 1051.

The decoding unit 1051 decodes the downlink data and outputs the decoded downlink data to the higher layer processing unit 101. The channel measurement unit 1059 calculates a downlink channel estimate from the reference signal and outputs the calculated downlink channel estimate to the demultiplexing unit 1055. The channel measurement unit 1059 calculates the channel state information, and outputs the channel state information to the higher layer processing unit 101.

The transmitter 107 generates an uplink reference signal according to the control signal input from the controller 103, codes and modulates the uplink data and the uplink control information input from the higher layer processing unit 101, multiplexes the uplink shared channel, the uplink control channel, the uplink reference signal, and transmits the result to the base station apparatus 3 through the transmit and receive antenna 109.

The coding unit 1071 codes the uplink control information and the uplink data input from the higher layer processing unit 101 and outputs the coded bits to the shared channel generation unit 1073 and/or the control channel generation unit 1075.

The shared channel generation unit 1073 may modulate the coded bits input from the coding unit 1071 to generate a modulation symbol, and generate the shared channel by performing DFT on the modulation symbol and output the result to the multiplexing unit 1077. The shared channel generation unit 1073 may modulate the coded bits input from the coding unit 1071 to generate a modulation symbol and output the modulation symbol to the multiplexing unit 1077. The shared channel generation unit 1073 may modulate the coded bits input from the coding unit 1071 to generate an uplink shared channel and output the generated uplink shared channel to the multiplexing unit 1077.

The control channel generation unit 1075 generates a control channel, based on the coded bits input from the coding unit 1071 and/or the scheduling request, and outputs the generated control channel to the multiplexing unit 1077.

The uplink reference signal generation unit 10711 generates an uplink reference signal, and outputs the generated uplink reference signal to the multiplexing unit 1077.

The multiplexing unit 1077 multiplexes a signal input from the shared channel generation unit 1073 and/or a signal input from the control channel generation unit 1075, and/or the uplink reference signal input from the uplink reference signal generation unit 10711 to the uplink resource element for each transmit antenna port in accordance with the control signal input from the controller 103.

The radio transmitting unit 1079 performs Inverse Fast Fourier Transform (IFFT) on a signal resulting from the multiplexing, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

An apparatus configuration of the base station apparatus 3 according to one aspect of the present invention will be described below.

Figure 10:
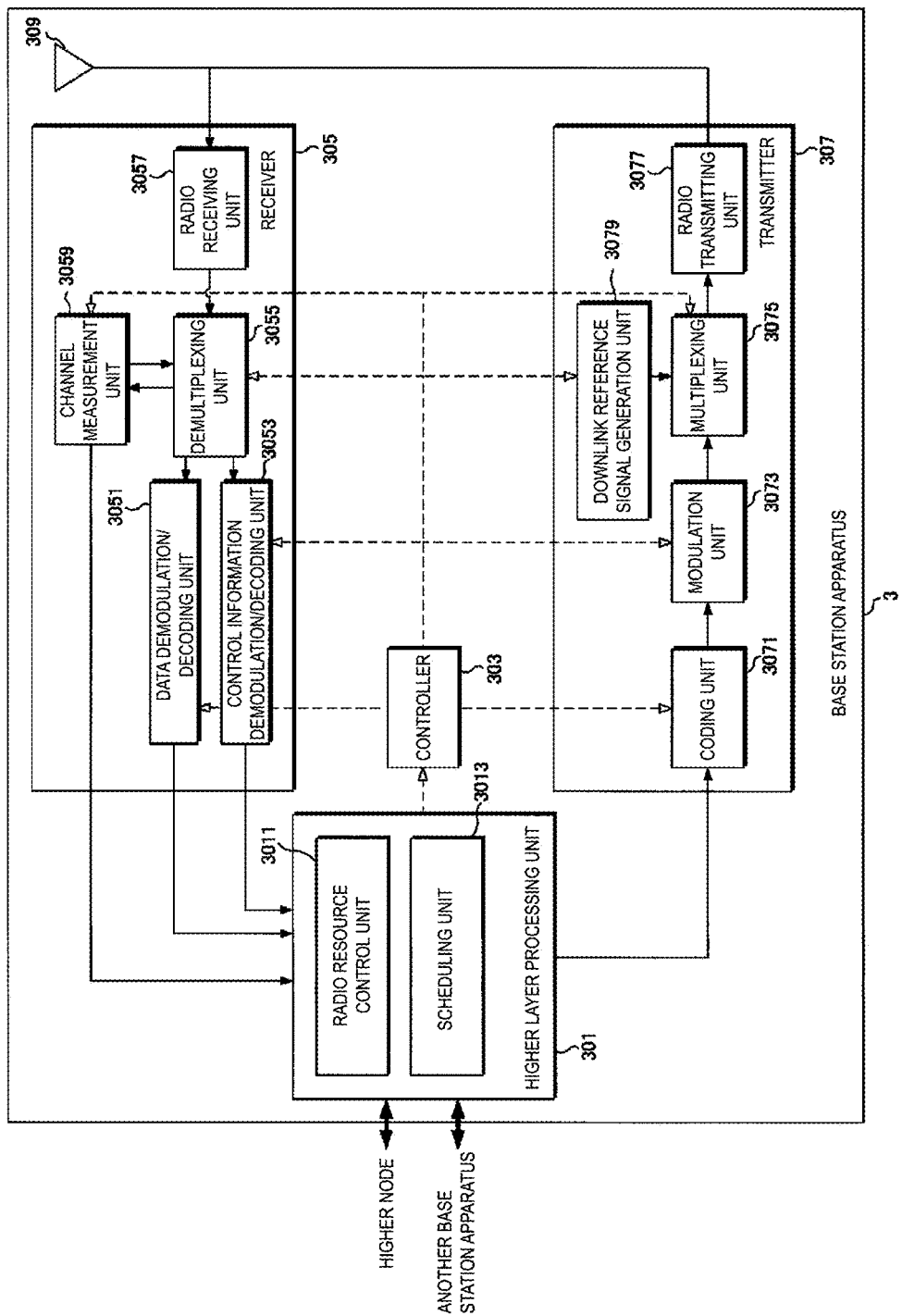
FIG. 10 is a schematic block diagram illustrating a configuration of a base station apparatus 3 according to one aspect the present embodiment.

FIG. 10 is a schematic block diagram illustrating a configuration of the base station apparatus 3 according to one aspect the present embodiment. As is illustrated, the base station apparatus 3 includes a higher layer processing unit 301, a controller 303, a receiver 305, a transmitter 307, and a transmit and receive antenna 309. The higher layer processing unit 301 includes a radio resource control unit 3011 and a scheduling unit 3013. The receiver 305 includes a data demodulation/decoding unit 3051, a control information demodulation/decoding unit 3053, a demultiplexing unit 3055, a radio receiving unit 3057, and a channel measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of the medium access control layer, the packet data convergence protocol layer, the radio link control layer, and the radio resource control layer. The higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, downlink data mapped to the downlink shared channel, RRC signaling, and MAC Control Element (CE), and outputs a signal resulting from the generation or the acquirement to the HARQ control unit 3013. Furthermore, the radio resource control unit 3011 manages various configuration information for each of the terminal apparatuses 1. For example, the radio resource control unit 3011 manages the serving cell configured to the terminal apparatus 1, and the like.

The scheduling unit 3013 included in the higher layer processing unit 301 manages the shared channel allocated to the terminal apparatus 1 and radio resources of the control channel. In a case that radio resources of the shared channel are allocated to the terminal apparatus 1, the scheduling unit 3013 generates an uplink grant indicating the allocation of the radio resources of the shared channel, and outputs the generated uplink grant to the transmitter 307.

In accordance with the control information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301.

The radio receiving unit 3057 orthogonally demodulates the uplink signal received via the transmit and receive antenna 309, and converts the orthogonally-demodulated analog signal to a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 1055 demultiplexes signal input from the radio receiving unit 3057 to a signal such as the uplink control channel, the uplink shared channel, the uplink reference signal channel, and the like. Note that the demultiplexing may be performed based on radio resource allocation information that is determined in advance by the base station apparatus 3 by using the radio resource control unit 3011 and that is included in the uplink grant notified to each of the terminal apparatuses 1. The demultiplexing unit 3055 compensates the channels of the uplink control channel and the uplink shared channel from the channel estimate value input from the channel measurement unit 3059. The demultiplexing unit 3055 outputs, to the channel measurement unit 3059, an uplink reference signal resulting from the demultiplexing.

The demultiplexing unit 3055 acquires the modulation symbol of the uplink data and the modulation symbol of the uplink control information (HARQ-ACK) from the demultiplexed uplink control channel and the uplink shared channel. The demultiplexing unit 3055 outputs the modulation symbol of the uplink data acquired from the shared channel signal to the data demodulation/decoding unit 3051. The demultiplexing unit 3055 outputs the modulation symbol of the uplink control information (HARQ-ACK) acquired from the control channel or the shared channel to the control information demodulation/decoding unit 3053.

The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The data demodulation/decoding unit 3051 decodes the uplink data from the modulation symbol of the uplink data input from the demultiplexing unit 3055. The data demodulation/decoding unit 3051 outputs the decoded uplink data to the higher layer processing unit 301.

The control information demodulation/decoding unit 3053 decodes HARQ-ACK from the modulation symbol of the HARQ-ACK input from the demultiplexing unit 3055. The control information demodulation/decoding unit 3053 outputs the decoded HARQ-ACK to the higher layer processing unit 301.

The transmitter 307 generates a downlink reference signal according to the control signal input from the controller 303, codes and modulates the downlink control information and the downlink data input from the higher layer processing unit 301, multiplexes the downlink control channel, the downlink shared channel, the reference signal channel, and transmits the signal to the terminal apparatus 1 through the transmit and receive antenna 309.

The coding unit 3071 codes the downlink control information and the downlink data input from the higher layer processing unit 301. The modulation unit 3073 modulates the coded bits input from the coding unit 3071, in compliance with the modulation scheme such as BPSK, QPSK, 16 QAM, or 64 QAM. The modulation unit 3073 may apply precoding to the modulation symbol. The precoding may include a transform precoding. Note that precoding may be a multiplication (application) of a precoder.

The downlink reference signal generation unit 3079 generates a downlink reference signal. The multiplexing unit 3075 multiplexes the modulation symbol and the downlink reference signal of each channel and generates a transmission symbol.

The multiplexing unit 3075 may apply precoding to the transmission symbol. The precoding applied by the multiplexing unit 3075 to the transmission symbol may be applied to the reference signal and/or the modulation symbol. The precoding applied to the downlink reference signal and the precoding applied to the modulation symbol may be the same or different.

The radio transmitting unit 3077 performs Inverse Fast Fourier Transform (IFFT) on the multiplexed transmission symbol and the like and generates a time symbol. The radio transmitting unit 3077 performs OFDM scheme modulation on the time symbol, generates a baseband digital signal, converts the baseband digital signal to an analog signal, generates an intermediate frequency in-phase component and an orthogonal component from the analog signal, removes frequency components unnecessary for the intermediate frequency band, and converts the intermediate frequency signal to a high-frequency signal, removes unnecessary frequency components, and generates a Carrier signal (Carrier, RF signal, and the like). The radio transmitting unit 3077 performs power amplification on the carrier signal and transmits the carrier signal to the transmit and receive antenna 309.

Various aspects of apparatuses according to one aspect of the present embodiment will be described below.

(1) To accomplish the object described above, aspects of the present invention are contrived to provide the following measures. Specifically, a first aspect of the present invention is a terminal apparatus including: a receiver configured to receive a PDCCH including downlink control information; and a transmitter configured to transmit a sPUSCH, based at least on detection of the PDCCH. A sum of the number of symbols to which the sPUSCH is mapped and the number of SC-FDMA symbols to which a DMRS associated with the sPUSCH is mapped is 2 and/or 3. In a case that a CRC added to the downlink control information is scrambled with a C-RNTI, the index of the SC-FDMA symbol to which the DMRS associated with the sPUSCH is mapped is given based at least on the downlink control information. In a case that the CRC added to the downlink control information is scrambled with an SPS C-RNTI, the index of the symbol to which the DMRS associated with the sPUSCH is mapped is given based at least on higher layer signaling.

(2) In the first aspect of the present invention, the sPUSCH is a first sPUSCH. The transmitter transmits a second sPUSCH, based at least on detection of the PDCCH. A sum of the number of SC-FDMA symbols to which the sPUSCH is mapped and the number of SC-FDMA symbols to which a DMRS associated with the second sPUSCH is mapped is 6 and/or 7. Regardless of whether a CRC added to the downlink control information is scrambled with a C-RNTI or scrambled with an SPS C-RNTI, an SC-FDMA symbol to which the DMRS associated with the second sPUSCH is mapped is the fourth SC-FDMA symbol of the slot.

(3) In the first aspect of the present invention, a first value lstart indicating the first SC-FDMA symbol to which the first sPUSCH is mapped is 0, 3, and/or 5 in an even number slot, the first value lstart is 0, 2, and/or 4 in an odd number slot, and the second value lstart indicating the first SC-FDMA symbol to which the second sPUSCH is mapped is 0 regardless of the slot number.

(4) A second aspect of the present invention is a terminal apparatus including: a receiver configured to receive a PDCCH including downlink control information; and a transmitter configured to transmit a sPUSCH, based at least on detection of the PDCCH. A sum of the number of first SC-FDMA symbols to which the sPUSCH is mapped and the number of second SC-FDMA symbols to which a DMRS associated with the sPUSCH is mapped is 2 or 3. In a case that a CRC added to the downlink control information is scrambled with a C-RNTI, an index of the second SC-FDMA symbol is given based at least on the downlink control information, and in a case that the CRC added to the downlink control information is scrambled with an SPS C-RNTI, an index of the second SC-FDMA symbol is smaller than an index of the first SC-FDMA symbol.

(5) In the second aspect of the present invention, the sPUSCH is a first sPUSCH. The transmitter transmits a second sPUSCH, based at least on detection of the PDCCH. A sum of the number of first SC-FDMA symbols to which the second sPUSCH is mapped and the number of second SC-FDMA symbols to which a DMRS associated with the second sPUSCH is mapped is 6 and/or 7. Regardless of whether a CRC added to the downlink control information is scrambled with a C-RNTI or scrambled with a SPS C-RNTI, an index of the second SC-FDMA symbol to which the DMRS associated with the second sPUSCH is mapped is 4.

(6) In the second aspect of the present invention, a first value lstart indicating the first SC-FDMA symbol to which the first sPUSCH is mapped is 0, 3, and/or 5 in an even number slot, the first value lstart is 0, 2, and/or 4 in an odd number slot, and the second value lstart indicating the first SC-FDMA symbol to which the second sPUSCH is mapped is 0 regardless of the slot number.

(7) A third aspect of the present invention is a terminal apparatus including: a receiver configured to receive a PDCCH including downlink control information; and a transmitter configured to transmit a sPUSCH, based at least on detection of the PDCCH. A sum of the number of first SC-FDMA symbols to which the sPUSCH is mapped and the number of second SC-FDMA symbols to which a DMRS associated with the sPUSCH is mapped is 2 or 3. An index of the second SC-FDMA symbol is given based at least on the first field included in the downlink control information. In a case that a CRC added to the downlink control information is scrambled with a SPS C-RNTI and an NDI field included in the downlink control information is set to 0, the downlink control information is considered to be effective SPS activation or SPS release, based at least on the fact that the first field is set to a prescribed value.

(8) In the third aspect of the present invention, in a case that the CRC added to the downlink control information is scrambled with the SPS C-RNTI and the NDI field included in the downlink control information is set to 0, the CRC is considered not matched, based at least on the fact that the first field is not set to the prescribed value.

(9) In the third aspect of the present invention, the sPUSCH is a first sPUSCH. The transmitter transmits a second sPUSCH, based at least on detection of the PDCCH. A sum of the number of first SC-FDMA symbols to which the sPUSCH is mapped and the number of second SC-FDMA symbols to which a DMRS associated with the second sPUSCH is mapped is 6 and/or 7. An index of the second SC-FDMA symbol to which the DMRS associated with the second sPUSCH is mapped is 4.

(10) In the third aspect of the present invention, a first value lstart indicating the first SC-FDMA symbol to which the first sPUSCH is mapped is 0, 3, and/or 5 in an even number slot, the first value lstart is 0, 2, and/or 4 in an odd number slot, and the second value lstart indicating the first SC-FDMA symbol to which the second sPUSCH is mapped is 0 regardless of the slot number.

(11) A fourth aspect of the present invention is a base station apparatus including: a transmitter configured to transmit a PDCCH including downlink control information; and a receiver configured to receive a sPUSCH that is transmitted based at least on detection of the PDCCH. A sum of the number of symbols to which the sPUSCH is mapped and the number of SC-FDMA symbols to which a DMRS associated with the sPUSCH is mapped is 2 and/or 3. In a case that a CRC added to the downlink control information is scrambled with a C-RNTI, the index of the SC-FDMA symbol to which the DMRS associated with the sPUSCH is mapped is given based at least on the downlink control information. In a case that the CRC added to the downlink control information is scrambled with an SPS C-RNTI, the index of the symbol to which the DMRS associated with the sPUSCH is mapped is given based at least on higher layer signaling.

(12) In the fourth aspect of the present invention, the sPUSCH is a first sPUSCH. The receiver receives a second sPUSCH that is transmitted based at least on detection of the PDCCH. A sum of the number of SC-FDMA symbols to which the sPUSCH is mapped and the number of SC-FDMA symbols to which a DMRS associated with the second sPUSCH is mapped is 6 and/or 7. Regardless of whether a CRC added to the downlink control information is scrambled with a C-RNTI or scrambled with an SPS C-RNTI, an SC-FDMA symbol to which the DMRS associated with the second sPUSCH is mapped is the fourth SC-FDMA symbol of the slot.

(13) In the fourth aspect of the present invention, a first value $l_{start}$ indicating the first SC-FDMA symbol to which the first sPUSCH is mapped is 0, 3, and/or 5 in an even number slot, the first value lstart is 0, 2, and/or 4 in an odd number slot, and the second value lstart indicating the first SC-FDMA symbol to which the second sPUSCH is mapped is 0 regardless of the slot number.

(14) A fifth aspect of the present invention is a base station apparatus including: a transmitter configured to transmit a PDCCH including downlink control information; and a receiver configured to receive a sPUSCH that is transmitted based at least on detection of the PDCCH. A sum of the number of first SC-FDMA symbols to which the sPUSCH is mapped and the number of second SC-FDMA symbols to which a DMRS associated with the sPUSCH is mapped is 2 or 3. In a case that a CRC added to the downlink control information is scrambled with a C-RNTI, an index of the second SC-FDMA symbol is given based at least on the downlink control information, and in a case that the CRC added to the downlink control information is scrambled with an SPS C-RNTI, an index of the second SC-FDMA symbol is smaller than an index of the first SC-FDMA symbol.

(15) In the fifth aspect of the present invention, the sPUSCH is a first sPUSCH. The receiver receives a second sPUSCH that is transmitted based at least on detection of the PDCCH. A sum of the number of first SC-FDMA symbols to which the second sPUSCH is mapped and the number of second SC-FDMA symbols to which a DMRS associated with the second sPUSCH is mapped is 6 and/or 7. Regardless of whether a CRC added to the downlink control information is scrambled with a C-RNTI or scrambled with a SPS C-RNTI, an index of the second SC-FDMA symbol to which the DMRS associated with the second sPUSCH is mapped is 4.

(16) In the fifth aspect of the present invention, a first value lstart indicating the first SC-FDMA symbol to which the first sPUSCH is mapped is 0, 3, and/or 5 in an even number slot, the first value lstart is 0, 2, and/or 4 in an odd number slot, and the second value lstart indicating the first SC-FDMA symbol to which the second sPUSCH is mapped is 0 regardless of the slot number.

(17) A sixth aspect of the present invention is a base station apparatus including: a transmitter configured to transmit a PDCCH including downlink control information; and a receiver configured to receive a sPUSCH that is transmitted based at least on detection of the PDCCH. A sum of the number of first SC-FDMA symbols to which the sPUSCH is mapped and the number of second SC-FDMA symbols to which a DMRS associated with the sPUSCH is mapped is 2 or 3. An index of the second SC-FDMA symbol is given based at least on the first field included in the downlink control information. In a case that a CRC added to the downlink control information is scrambled with a SPS C-RNTI and an NDI field included in the downlink control information is set to 0, the downlink control information is considered to be effective SPS activation or SPS release, based at least on the fact that the first field is set to a prescribed value.

(18) In the sixth aspect of the present invention, in a case that the CRC added to the downlink control information is scrambled with the SPS C-RNTI and the NDI field included in the downlink control information is set to 0, the CRC is considered not matched, based at least on the fact that the first field is not set to the prescribed value.

(19) In the sixth aspect of the present invention, the sPUSCH is a first sPUSCH. The receiver receives a second sPUSCH that is transmitted based at least on detection of the PDCCH. A sum of the number of first SC-FDMA symbols to which the sPUSCH is mapped and the number of second SC-FDMA symbols to which a DMRS associated with the second sPUSCH is mapped is 6 and/or 7. An index of the second SC-FDMA symbol to which the DMRS associated with the second sPUSCH is mapped is 4.

(20) In the sixth aspect of the present invention, a first value lstart indicating the first SC-FDMA symbol to which the first sPUSCH is mapped is 0, 3, and/or 5 in an even number slot, the first value lstart is 0, 2, and/or 4 in an odd number slot, and the second value lstart indicating the first SC-FDMA symbol to which the second sPUSCH is mapped is 0 regardless of the slot number.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Controller
105 Receiver
107 Transmitter
109 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
301 Higher layer processing unit
303 Controller
305 Receiver
307 Transmitter
309 Transmit and receive antenna
3011 Radio resource control unit
3013 Scheduling unit
3051 Data demodulation/decoding unit
3053 Control information demodulation/decoding unit
3055 Demultiplexing unit
3057 Radio receiving unit
3059 Channel measurement unit
3071 Coding unit
3073 Modulation unit
3075 Multiplexing unit
3077 Radio transmitting unit
3079 Downlink reference signal generation unit
100001 Bit sequence
100002 Scrambling bit sequence
100003 Complex-valued modulation symbol sequence
100004 Transmission layer complex-valued modulation symbol sequence
100005 Transform precoding complex-valued modulation symbol sequence
100006 Precoding complex-valued modulation symbol sequence

The invention claimed is:

1. A terminal apparatus comprising:
a receiver configured to receive a physical downlink control channel (PDCCH) including a downlink control information (DCI) format; and
a transmitter configured to transmit a physical uplink shared channel (PUSCH), based at least on detection of the PDCCH, wherein
in a case that a transmission time interval (TTI) of the PUSCH corresponds to two or three single carrier-frequency division multiple access (SC-FDMA) symbols,
semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a demodulation reference signal (DMRS) mapping indication field included in the DCI format is set to a prescribed value, and
the DMRS mapping indication field indicates an index of an SC-FDMA symbol in which a DMRS associated with the PUSCH is mapped.

2. A base station apparatus comprising:
a transmitter configured to transmit a physical downlink control channel (PDCCH) including a downlink control information (DCI) format; and
a receiver configured to receive a physical uplink shared channel (PUSCH) based at least on detection of the PDCCH, wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a demodulation reference signal (DMRS) mapping indication field included in the DCI format is set to a prescribed value, and the DMRS mapping indication field indicates an index of an SC-FDMA symbol in which a DMRS associated with the PUSCH is mapped.

3. A communication method used for a terminal apparatus, the communication method comprising the steps of:

receiving a physical downlink control channel (PDCCH) including a downlink control information (DCI) format; and transmitting a physical uplink shared channel (PUSCH), based at least on detection of the PDCCH, wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a demodulation reference signal (DMRS) mapping indication field included in the DCI format is set to a prescribed value, and the DMRS mapping indication field indicates an index of an SC-FDMA symbol in which a DMRS associated with the PUSCH is mapped.

4. A radio communication method used for a base station apparatus, the communication method comprising the steps of:

transmitting a physical downlink control channel (PDCCH) including a downlink control information (DCI) format; and receiving a physical uplink shared channel (PUSCH) based at least on detection of the PDCCH, wherein in a case that a transmission time interval (TTI) of the PUSCH corresponds to two or three single carrier-frequency division multiple access (SC-FDMA) symbols, semi-persistent scheduling assignment (SPS assignment) is validated, based on a fact that a cyclic redundancy check (CRC) sequence given for a payload included in the PDCCH is scrambled with a semi-persistent scheduling-cell-radio network temporary identifier (SPS-C-RNTI), a new data indicator included in the PDCCH is set to 0, and a bit of a DMRS mapping indication field included in the DCI format is set to a prescribed value, and the DMRS mapping indication field indicates an index of an SC-FDMA symbol in which a DMRS associated with the PUSCH is mapped.

* * * * *